(12) United States Patent
Lerman

(10) Patent No.: US 9,658,382 B2
(45) Date of Patent: May 23, 2017

(54) LUMINAIRE MODULE HAVING A LIGHT GUIDE WITH REDIRECTING INTERFACES

(71) Applicant: Quarkstar LLC, Las Vegas, NV (US)

(72) Inventor: Louis Lerman, Las Vegas, NV (US)

(73) Assignee: Quarkstar LLC, Las Vegas, NV (US)

(*) Notice: Subject to any disclaimer, the term of this patent is extended or adjusted under 35 U.S.C. 154(b) by 0 days.

(21) Appl. No.: 14/438,446

(22) PCT Filed: Jan. 26, 2015

(86) PCT No.: PCT/US2015/012921
§ 371 (c)(1),
(2) Date: Apr. 24, 2015

(87) PCT Pub. No.: WO2015/147978
PCT Pub. Date: Oct. 1, 2015

(65) Prior Publication Data
US 2016/0252672 A1   Sep. 1, 2016

Related U.S. Application Data

(60) Provisional application No. 61/972,154, filed on Mar. 28, 2014.

(51) Int. Cl.
*F21V 8/00* (2006.01)
*F21V 13/04* (2006.01)
(Continued)

(52) U.S. Cl.
CPC .............. *G02B 6/0038* (2013.01); *F21S 8/04* (2013.01); *F21V 7/0008* (2013.01);
(Continued)

(58) Field of Classification Search
CPC .... G02B 6/001; G02B 6/0023; G02B 6/0038; G02B 6/0045; G02B 6/0085; F21S 8/04; F21V 7/0008; F21V 7/0091
See application file for complete search history.

(56) References Cited

U.S. PATENT DOCUMENTS

| 4,432,039 A * | 2/1984 | Cibie .................. F21S 48/1241 362/307 |
| 4,576,436 A | 3/1986 | Daniel |

(Continued)

FOREIGN PATENT DOCUMENTS

| CA | 2702690 C | 4/2013 |
| EP | 704655 B1 | 3/1999 |

(Continued)

OTHER PUBLICATIONS

Authorized Officer Laurence Potier, Notification of Transmittal of the International Search Report and the Written Opinion of the International Searching Authority, International Application No. PCT/US2015/012921, mailed Apr. 1, 2015, 9 pages.

(Continued)

*Primary Examiner* — Alan Cariaso
(74) *Attorney, Agent, or Firm* — Fish & Richardson P.C.

(57) ABSTRACT

A solid-state luminaire module includes one or more light-emitting elements (LEEs) and a light guide. The light guide includes a receiving end and an opposing end, the receiving end being arranged to receive the light provided by the LEEs; a pair of opposing side surfaces, extending along a length of the light guide between the receiving end and the opposing end, to guide the received light in a forward direction; and a plurality of redirecting interfaces spaced apart from each other and distributed along a portion of the length of the light guide adjacent the opposing end. The redirecting interfaces are configured to reflect a portion of the guided light in a backward direction as return light, such that the return light can transmit through the pair of opposing side surfaces into the ambient as output light of the luminaire module, the output light to propagate in backward directions.

16 Claims, 8 Drawing Sheets

(51) Int. Cl.
  *F21S 8/04* (2006.01)
  *F21V 7/00* (2006.01)
  *F21Y 101/00* (2016.01)
  *F21Y 103/10* (2016.01)
  *F21Y 115/10* (2016.01)

(52) U.S. Cl.
  CPC .......... *F21V 7/0091* (2013.01); *G02B 6/0023* (2013.01); *G02B 6/0045* (2013.01); *G02B 6/0085* (2013.01); *F21Y 2101/00* (2013.01); *F21Y 2103/10* (2016.08); *F21Y 2115/10* (2016.08)

(56) References Cited

U.S. PATENT DOCUMENTS

| | | | |
|---|---|---|---|
| 6,014,192 A * | 1/2000 | Lehureau | F21V 9/14 349/61 |
| 6,910,783 B2 * | 6/2005 | Mezei | G02B 6/001 362/23.09 |
| 7,380,962 B2 | 6/2008 | Chaves | |
| 8,177,408 B1 | 5/2012 | Coleman | |
| 8,249,408 B2 | 8/2012 | Coleman | |
| 8,480,276 B2 | 7/2013 | Frankiewicz | |
| 8,646,953 B2 | 2/2014 | Mochizuki | |
| 9,228,702 B2 * | 1/2016 | Welten | F21K 9/52 |
| 2006/0050282 A1 | 3/2006 | de Lamberterie | |
| 2006/0269213 A1 | 11/2006 | Hwang | |
| 2008/0158905 A1 * | 7/2008 | Chuang | G02B 6/001 362/581 |
| 2008/0259640 A1 | 10/2008 | Parker | |
| 2010/0321952 A1 | 12/2010 | Coleman | |
| 2012/0268966 A1 | 10/2012 | McCollum | |
| 2012/0287633 A1 | 11/2012 | Kelly | |
| 2013/0033900 A1 | 2/2013 | McCollum | |
| 2013/0201715 A1 | 8/2013 | Dau | |
| 2014/0043846 A1 | 2/2014 | Yang | |

FOREIGN PATENT DOCUMENTS

| | | |
|---|---|---|
| EP | 2738449 A1 | 6/2014 |
| FR | 2934353 A1 | 1/2010 |
| WO | WO0250590 A1 | 6/2002 |
| WO | WO2008047278 A3 | 9/2008 |
| WO | WO2012176352 A1 | 12/2012 |
| WO | WO2014033686 A3 | 5/2014 |

OTHER PUBLICATIONS

Authorized Officer Evelyne Prouteau, Notification of Transmittal of the International Search Report and the Written Opinion of the International Searching Authority, International Application No. PCT/US2015/012881, mailed Apr. 7, 2015, 10 pages.

* cited by examiner optional: 145 and/or one or more of 142b-i, where i = 1-N.
when 142b-i is absent, corresponding output light beam 152b-i also is absent.

LUMINAIRE MODULE HAVING A LIGHT GUIDE WITH REDIRECTING INTERFACES

CROSS-REFERENCE TO RELATED APPLICATIONS

This application is a U.S. National Stage of International Application No. PCT/US2015/012921, filed Jan. 26, 2015, which claims benefit under 35 U.S.C. §119(e)(1) of U.S. Provisional Application No. 61/972,154, filed on Mar. 28, 2014, which are incorporated by reference herein.

FIELD OF THE TECHNOLOGY

The present technology relates generally to solid-state luminaires, and more specifically to solid-state luminaire modules having a light guide with redirecting interfaces.

BACKGROUND

Light sources are used in a variety of applications, such as for providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present technology relates to solid-state luminaires. According to a first aspect of the present technology, a luminaire module includes one or more light-emitting elements (LEEs) arranged to provide light, and a light guide. The light guide includes a receiving end and an opposing end. The receiving end is arranged to receive the light provided by the LEEs. Further, the light guide includes a pair of opposing side surfaces extending along a length of the light guide between the receiving end and the opposing end, such that the light guide is configured to guide the received light in a forward direction, along the length of the light guide to the opposing end of the light guide. Additionally, the light guide includes a plurality of redirecting interfaces spaced apart from each other and distributed along a portion of the length of the light guide adjacent the opposing end. The redirecting interfaces are configured to reflect a portion of the guided light in a backward direction as return light, such that substantially all the return light can transmit through the pair of opposing side surfaces into the ambient as output light of the luminaire module. The output light is to propagate in backward directions.

Implementations of the first aspect may include one or more of the following features. In some implementations, the plurality of redirecting interfaces can include a redirecting end-face located at the opposing end, and the redirecting interfaces different from the redirecting end-face can further be configured to transmit a remaining portion of the guided light in the forward direction, such that the transmitted light can be guided by the light guide in the forward direction. For example, the redirecting end-face can have a reflectivity larger than 98%.

In some implementations, the light guide can be configured to guide the received light in a forward direction through total internal reflection (TIR) off the opposing side surfaces.

In some implementations, reflectivities of the redirecting interfaces can be selected, such that return light from each of the redirecting interfaces has substantially the same intensity. In other implementations, the redirecting interfaces can have substantially the same reflectivity.

In some implementations, the redirecting interfaces can be coated with reflecting material. For example, the reflecting material has voids that allow light to transmit through the redirecting interfaces.

In some implementations, the portion of the length of the light guide over which the redirecting interfaces are distributed can be a fraction of a distance between the receiving end and opposing end. For example, the fraction is 90% or less. As another example, the fraction is 50% or less. As yet another example, the fraction is 10% or less.

In some implementations, the light provided by the LEEs is in a first angular range, and a numerical aperture of the light guide can be such that the light received from the LEEs in the first angular range is guided by the light guide through TIR off the pair of opposing side surfaces. In other implementations, the luminaire module can include one or more optical couplers. Here, the light provided by the LEEs is in a first angular range, the optical couplers can be arranged to receive the light provided by the LEEs and redirect it to the receiving end of the light guide in a second angular range, and a numerical aperture of the light guide is such that the light received from the optical couplers in the second angular range is guided by the light guide through TIR off the pair of opposing side surfaces.

In the above cases, for each redirecting interface of the plurality of redirecting interfaces, the guided light that reaches the redirecting interface is in a third angular range and a configuration of the redirecting interface is such that return light generated by the redirecting interface is in a first return angular range. Here, the first return angular range has substantially no overlap with the third angular range, such that the return light within the first return angular range impinges on a first side surface of the pair of opposing side surfaces at incident angles larger than critical incidence. Moreover, the return light in the first return angular range transmits through the first side surface as output light in a first output angular range with a propagation direction having a component anti-parallel to the forward direction. In this case, each of the redirecting interfaces can include one or more sawtooth-shaped sections. In some cases, the sawtooth-shaped sections are symmetrical.

Additionally, the configuration of the redirecting interface can be such that return light generated by the redirecting interface is also in a second return angular range, and the second return angular range has substantially no overlap with the third angular range, such that the return light within the second return angular range impinges on the second side surface of the pair of opposing side surfaces at incident angles larger than critical incidence. Here, the return light in the second return angular range transmits through the second side surface as output light in a second output angular range with a propagation direction having a component anti-parallel to the forward direction.

These and/or other advantages may be provided by luminaire modules that are relatively inexpensive to manufacture. For example, the individual components of the disclosed luminaire modules may be formed from conventional optical materials (e.g., optical plastics such as acrylic polymers or polycarbonate) and/or by conventional techniques. The present technology can allow for more compact luminaire modules. Relying in part on light redirection from optical structures that are internal to components of the luminaire module can provide good light mixing and high module rigidity. Such luminaire modules may require less material, may be made smaller and lighter. As such, the disclosed luminaire modules may require less volume which can help lower manufacturing and distribution cost.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE FIGURES

Like elements in different figures are identified with the same reference numeral.

DETAILED DESCRIPTION OF THE TECHNOLOGY

Figure 1A:
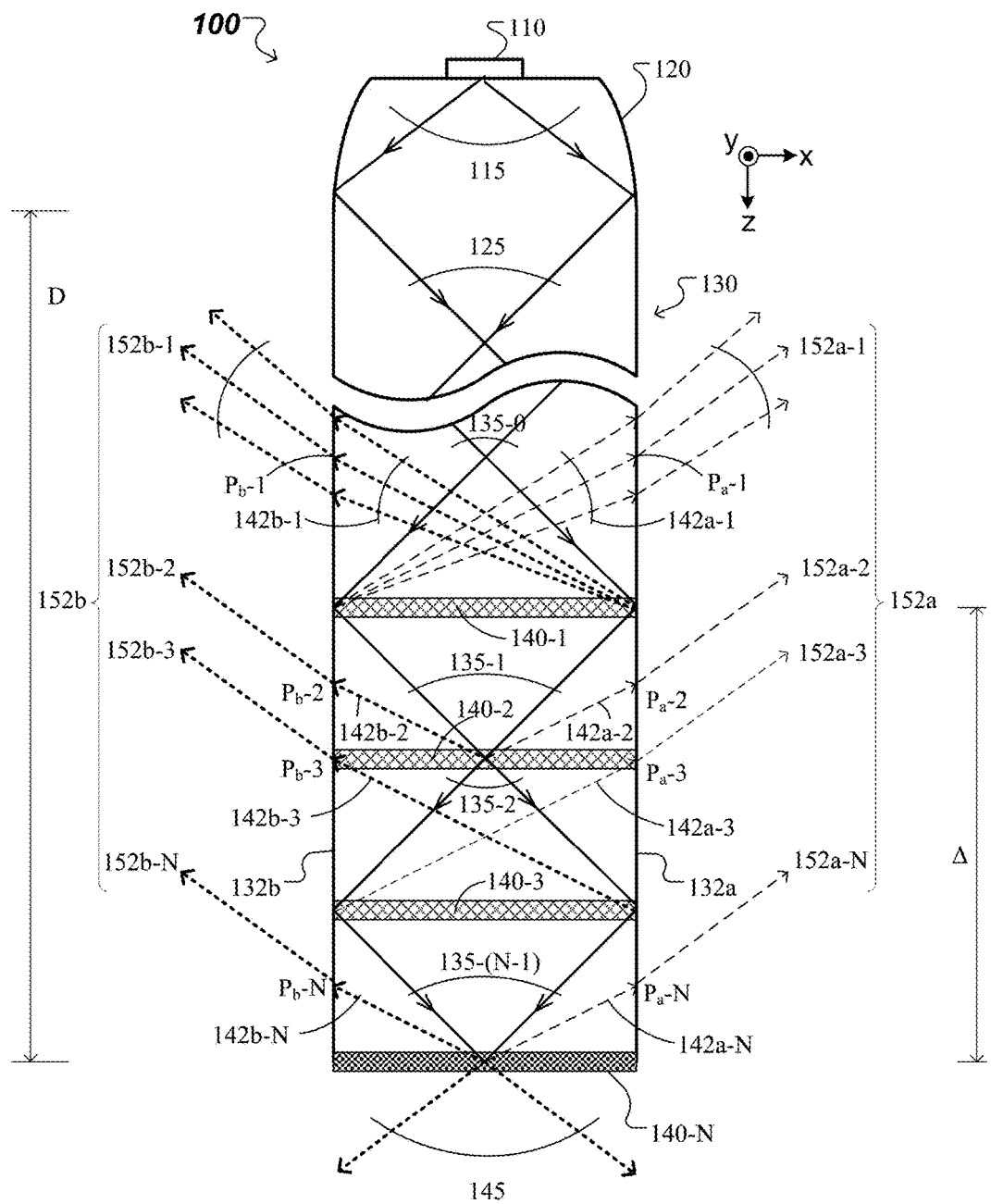
FIG. 1A illustrates aspects of a solid-state luminaire module having a light guide with redirecting interfaces.

FIG. 1A illustrates a schematic x-z sectional view of a solid-state luminaire module 100 that includes a light guide 130 with redirecting interfaces 140-$i$, where i=1 to N, and N≥2. In the example illustrated in FIG. 1A, in addition to the light guide 130, the luminaire module 100 includes one or more light emitting elements (LEEs) 110 and one or more couplers 120. In other cases, the couplers 120 are excluded and light emitted by the LEEs 110 is injected directly into the light guide 130.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis of the Cartesian reference system shown in FIG. 1A.)

In the example illustrated in FIG. 1A, the luminaire module 100 includes one or more couplers 120 to receive the light from the LEEs 110 within the first angular range 115 and provide light within a second angular range 125 to the receiving end of the light guide 130. The one or more couplers 120 are shaped to transform the first angular range 115 into the second angular range 125 via total internal reflection, specular reflection or both. As such, the one or more couplers 120 can include a solid transparent material for propagating light from an input end to an output end of each of the one or more couplers 120. Here, the divergence of the second angular range 125 is smaller than the divergence of the first angular range 115, such that all light provided by the couplers 120 in the angular range 125 can be injected into the light guide 130 at its receiving end. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 2E-2F or 3E-3F.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

The light guide 130 is made from a solid, transparent material. The light guide 130 is arranged to receive the light provided by the one or more couplers 120 at one end of the light guide 130 and to guide the received light in a forward direction, e.g., along the z-axis, from the receiving end to an opposing end of the light guide 130. Here, a distance D between the receiving end of the light guide 130 and its opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132$a$, 132$b$ of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end, without the use of the couplers 120.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b, an angular range 135-(N−1) of the guided light at the opposing end of the light guide 130 is different than the angular range 115 (when the light guide 130 receives the light directly from the LEEs 110) or 125 (when the light guide 130 receives the light from the couplers 120) of the light received at the receiving end. In embodiments with parallel light guide side surfaces 132a, 132b, the angular range 135-(N−1) of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end. Here, the light guide side surfaces 132a, 132b are optically smooth to allow for the guided light to propagate inside the light guide 130 through TIR.

Moreover, the light guide 130 has a plurality of redirecting interfaces 140-$i$, where i=1 to N, and N≥2. The last redirecting interface, 140-N, represents a redirecting end-face 140-N at the opposing end of the light guide 130. The redirecting interfaces 140-$i$ of the light guide 130 are spaced-apart from each other and distributed along the z-axis over a distance Δ of the light guide 130. In some implementations, the distance Δ over which the redirecting interfaces 140-$i$ are distributed is a fraction of up to 10% of the distance D from the input end to the opposing end of the light guide 130. In other implementations, the distance Δ over which the redirecting interfaces 140-$i$ are distributed is a fraction of up to 50% of the distance D from the input end to the opposing end of the light guide 130. In some other implementations, the distance Δ over which the redirecting interfaces 140-$i$ are distributed is a fraction of up to 90% of the distance D from the input end to the opposing end of the light guide 130.

Figure 1B:
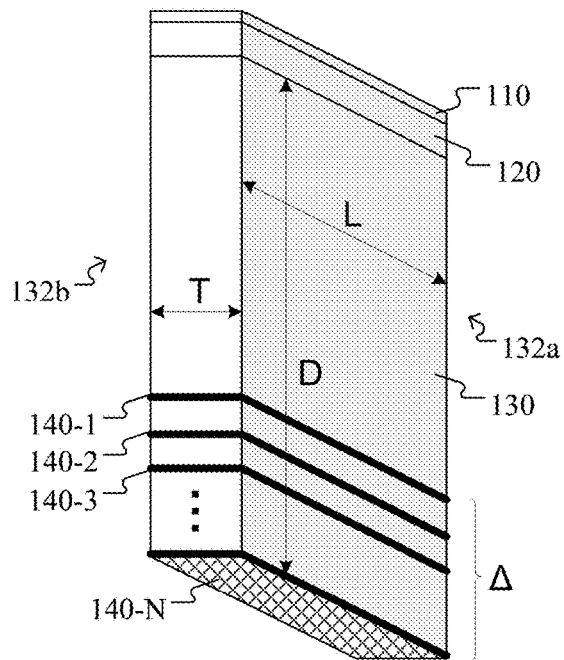
FIGS. 1B-1D are schematics of various embodiments of the luminaire module of FIG. 1A.

FIG. 1B shows an embodiment 100' of the luminaire module—that includes a light guide 130 with redirecting interfaces 140-$i$, i=1 to N—that is elongated along an axis (e.g., y-axis) perpendicular to the forward direction (e.g., along the z-axis.) In this case, a length L of the light guide 130 along the elongate dimension of the luminaire module 100' can be 2', 4' or 8', for instance. A thickness T of the light guide 130 orthogonal to the elongated dimension L (e.g., along the x-axis) is chosen to be a fraction of the distance D traveled by the guided light from the receiving end to the opposing end of the light guide 130. For T=0.05 D, 0.1 D or 0.2 D, for instance, light from multiple, point-like LEEs 110—distributed along the elongated dimension L—that is edge-coupled into the light guide 130 at the receiving end can efficiently mix by the time it propagates to the opposing end. In some implementations surfaces 132, 132a/b of the light guide may have a non-planar shape and/or a non-parallel arrangement to support mixing of light from multiple point-like LEEs 110.

Figure 1C:
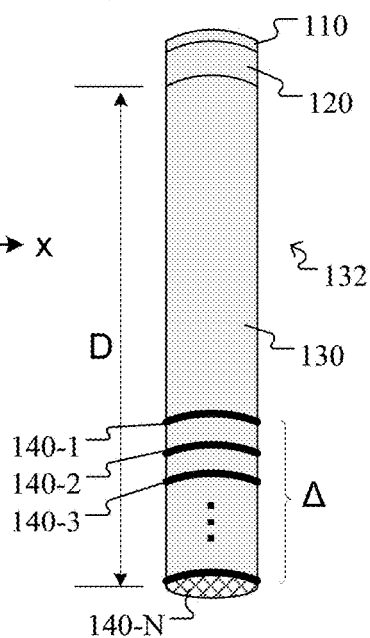

FIG. 1C shows an embodiment 100" of the luminaire module—that includes a light guide 130 with redirecting interfaces 140-$i$, i=1 to N—that has a (e.g., continuous) rotational symmetry about the forward direction (e.g., z-axis.) Here, a diameter of the light guide 130 is a fraction of the distance D traveled by the guided light from the receiving end to the opposing end of the light guide 130. For example, the diameter of the light guide 130 can be 0.05 D, 0.1 D or 0.2 D, for instance.

Figure 1D:
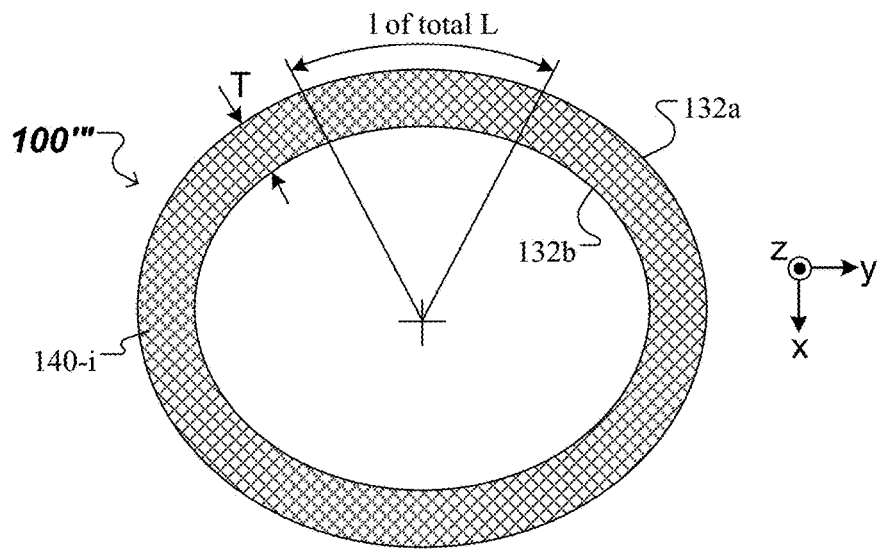

Other symmetry or asymmetry about the forward direction of the disclosed luminaire module is possible. FIG. 1D shows an embodiment 100''' of the luminaire module—that includes a light guide 130 with redirecting interfaces 140-$i$, i=1 to N—for which the light guide 130 has two opposing side surfaces 132a, 132b that form a cylinder shell of thickness T. In the example illustrated in FIG. 1D, the x-y cross-section of the cylinder shell formed by the opposing side surfaces 132a, 132b is oval. In other cases, the x-y cross-section of the cylinder shell can be circular or can have other shapes. Some implementations of the example luminaire module 100' or 100''' may include a specular reflective coating on the side surface 132b.

The number of LEEs 110 of the luminaire module 100' or 100''' generally depends, inter alia, on the length L, where more LEEs are used for longer luminaire modules. In some implementations, the number of LEEs 110 can include between 10 and 1,000 LEEs (e.g., about 50 LEEs, about 100 LEEs, about 200 LEEs, about 500 LEEs). Generally, the density of LEEs (e.g., number of LEEs per unit length) also depends on the nominal power of the LEEs and illuminance desired from the luminaire module. For example, a relatively high density of LEEs can be used in applications where high illuminance is desired or where low power LEEs are used. In some implementations, the luminaire module 100' or 100''' has LEE density along its length of 0.1 LEE per centimeter or more (e.g., 0.2 per centimeter or more, 0.5 per centimeter or more, 1 per centimeter or more, 2 per centimeter or more). In some implementations, LEEs can be evenly spaced along the length, L, of the luminaire module. In some implementations, a heat-sink can be attached to the LEEs 110 to extract heat emitted by the LEEs. The luminaire module 100", for example, can include one or more LEEs. Luminaire modules in general can include one or multiple types of LEEs, for example one or more subsets of LEEs in which each subset can have different color or color temperature.

In luminaire modules that include a light guide 130 with redirecting interfaces 140-$i$, where i=1 to N, and multiple point-like LEEs 110, the distance D through which edge-coupled light propagates through the light guide 130 in the forward direction (e.g., along the z-axis) may be based on the amount of mixing required to provide desired uniformity of certain aspects of the light output (e.g., in one or more output angular ranges 152a, 152b, 145) by the luminaire modules.

Referring again to FIG. 1A, each redirecting interface 140-$i$, i=1 to (N−1) of the light guide 130, except for the redirecting end-face 140-N, reflects a fraction R1 of the guided light—incident on the redirecting interface 140-$i$—backward (along the −z axis) into the light guide, and transmits the remaining fraction T1 of the guided light—incident on the redirecting interface 140-$i$—forward (along the +z axis) into the light guide. Here, $R_i + T_i \approx 1$, i=1 to (N−1). Similarly, the redirecting end-face 140-N reflects a fraction $R_N$ of the guided light—that reaches the opposite end of the light guide—back into the light guide, and transmits the remaining fraction $T_N$ of the guided light—that reaches the opposite end—forward (in the +z direction) outside of the light guide. Here, $R_N + T_N \approx 1$. In some implementations, no light is transmitted through redirecting end-face 140-N.

The light reflected in the backward direction by each redirecting interface 140-$i$, i=1 to N, is referred to as return light. Each redirecting interface 140-$i$ is configured to generate return light in a first return angular range 142a-$i$ (and optionally a second return angular range 142b-$i$), i=1 to N, such that, the return light can transmit through the light guide side surfaces 132a, 132b. Here, a portion (e.g., more than 95% for a glass/plastic-to-air index mismatch of a light guide side surface interface) of the return light—within the first return angular range 142a-i—will have a first output angular range 152a-i after transmission through the light guide side surface 132a, and another portion (e.g., more than 95% for the glass/plastic-to-air index mismatch of the light guide side surface interface) of the return light—within the second return angular range 142b-i—will have a second output angular range 152b-i after transmission through the opposing light guide side surface 132b, where i=1 to N. As prevalent propagation direction of light in each of the first and second output angular ranges 152a-i, 152b-i has a component anti-parallel to the z-axis, the luminaire module 100 outputs light in the backward direction.

Each redirecting interface including the end-face 140-i, where i=1 to N, can have macro-, meso- and/or microscopic interface/surface structures as described below in connection with FIGS. 2A-2D and 3A-3D. Depending on the implementation, one or more redirecting interfaces can be redirecting across portions of their width or across their full width. As such the redirecting interfaces can be contiguous or interrupted by gaps. Gaps may allow light to pass freely without obstruction. The width of gaps can be regular or irregular for different redirecting interfaces or within the same redirecting interface. Gaps in one redirecting interface can be offset, for example in x-direction and/or y-direction, by a portion or all of the corresponding width of gaps in an adjacent redirecting interface.

Reflection at the redirecting interface 140-i—e.g., the divergence of and the prevalent propagation direction within each of the first 142a-i and second 142b-i return angular ranges of the return light—depends on shape and arrangement of the structure of the redirecting interface 140-i, where i=1 to N. Typically, the redirecting interface 140-i, i=1 to N, is coated with a reflective material and has a corresponding reflectivity $R_i$. In some implementations, the reflectivity $R_i$ of the redirecting interface 140-i, i=1 to N, including a uniformly formed reflective coating is determined by reflectivity of constitutive materials and forming process of the coated layer. For example, the redirecting interface 140-i coated with Ag can have a reflectivity between 40%-75%. Here, about 40%-75% of the light impinging on the redirecting interface 140-i within an angular range 135-(i−1) is returned into first and second return angular ranges 142a-i, 142b-i, while between 60%-25% of the light impinging on the redirecting interface 140-i within an angular range 135-(i−1) is transmitted through the redirecting interface 140-i within an angular range 135-i to be guided forward by the light guide 130. In other implementations, when the redirecting interface 140-i, i=1 to N, is formed as a coating that contains a plurality of apertures, the reflectivity $R_i$ of the redirecting interface 140-i is determined not only by the reflectivity of the constitutive materials and the forming process of the coated layer, but also by a ratio of cumulative area of the apertures to the area of the redirecting interface 140-i. For example, an Ag coating of the redirecting interface 140-i can have a reflectance of 99% or larger. However, this Ag coating is formed to contain apertures that can cover 70% of an area of the redirecting interface 140-i. Here, about 30% of the light impinging on the redirecting interface 140-i within an angular range 135-(i−1) is returned into first and second return angular ranges 142a-i, 142b-i, while about 70% of the light impinging on the redirecting interface 140-i within an angular range 135-(i−1) is transmitted through the redirecting interface 140-i within an angular range 135-i to be guided forward by the light guide 130.

In some implementations, the redirecting end-face 140-N of the light guide can have reflectivity >99% such that substantially all light impinging on the redirecting end-face 140-N is reflected back into the light guide 130 as return light. In other implementations, the redirecting end-face 140-N reflects a fraction RN of the guided light—that reaches the opposite end of the light guide within the angular range 135-(N−1)—back into the light guide within first and second return angular ranges 142a-N, 142b-N, and transmits the remaining fraction $T_N$ of the guided light—that reaches the opposite end within the angular range 135-(N−1)—forward (in the +z direction) outside of the light guide as forward output light in the third output angular range 145.

During operation, the LEEs 110 provide light within a first angular range 115 relative to the z-axis. The one or more couplers 120 are configured to receive the light from the LEEs 110 within the first angular range 115 and provide light within a second angular range 125 to the light guide 130. The one or more couplers 120 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 130 is chosen to allow for the light received from the one or more couplers 120 at the receiving end of the light guide 130 to propagate to the opposing end of the light guide 130, for example, via TIR.

In this manner, light received by the light guide 130 at the receiving end from the one or more couplers 120 in the second angular range 125 is guided forward (along the z-axis) by the light guide 130 from its receiving end to its opposing end. As it propagates through the light guide 130, the guided light successively interacts with the redirecting interfaces 140-i, i=1 to N. Forward guided light impinging at a redirecting interface 140-i has an angular range 135-(i−1). In some implementations, the angular range 135-(i−1) is substantially the same as the second angular range 125. Further at the redirecting interface 140-i, the forward guided light impinges on the redirecting interface 140-i where at least a portion of it is reflected back into the light guide 130 as return light.

The structure of the redirecting interface 140-i is configured to cause the return light to propagate only in corresponding return angular range 142a-i or 142b-i, or both. Here, substantially all return light within each of the return angular ranges 142a-i and 142b-i propagates only along rays that impinge on the respective light guide side surfaces 132a and 132b at angles smaller than a critical incident angle. In this manner, the return light in return angular ranges 142a-i, 142b-i can transmit through the light guide side surfaces 132a and 132b as output light of the luminaire module 100 in corresponding first and second output angular ranges 152a-i, 152b-i. Notably, the structure of the redirecting interface 140-i may need to be configured such that no return light propagates within an angular range that is an inverse of the angular range 135-(i−1), because such return light could be guided back towards the receiving end or a previously traversed redirecting interface 140-(i−1) via TIR, and hence, would not contribute to the output light of the luminaire module 100.

Additionally, a fraction of the forward guided light having the angular range 135-(i−1) that impinges on the redirecting interface 140-$i$ and is not reflected back into the light guide 130 as return light is transmitted through the redirecting interface 140-$i$ in the forward direction (e.g., along the z-axis) in an angular range 135-$i$. In some implementations, e.g., in cases when the redirecting interface 140-$i$ includes apertures or transparent portions of coating, the angular range 135-$i$ of the transmitted light is substantially the same as the angular range 135-$(i-1)$ of the guided light that impinges on the redirecting interface 140-$i$. Moreover, a fraction of the forward guided light that impinges on the redirecting end-face 140-N and is not reflected back into the light guide 130 as return light is transmitted through the redirecting end-face 140-N in the forward direction (e.g., along the z-axis) in a third output angular range 145. In some implementations, e.g., in cases when the redirecting end-face 140-N includes apertures or transparent portions of coating, the third output angular range 145 is substantially the same as the angular range 135-(N-1) of the guided light that reaches the opposing end of the light guide 130.

Various embodiments of the redirecting interfaces 140-$i$, are now described along with corresponding intensity distributions of the light output by the luminaire module 100 when equipped with the described redirecting interfaces 140-$i$, where i=1 to N.

Embodiments of the redirecting interfaces 140-$i$, i=1 to N, with interface structure that causes the return light to propagate in both return angular ranges 142$a$ and 142$b$ are described first. In these embodiments, the interface surface structure includes one or more symmetric v-grooves or a symmetric sawtooth pattern. Here, walls of the symmetric sawtooth pattern can be planar or curved.

Figures 2A, 2B:
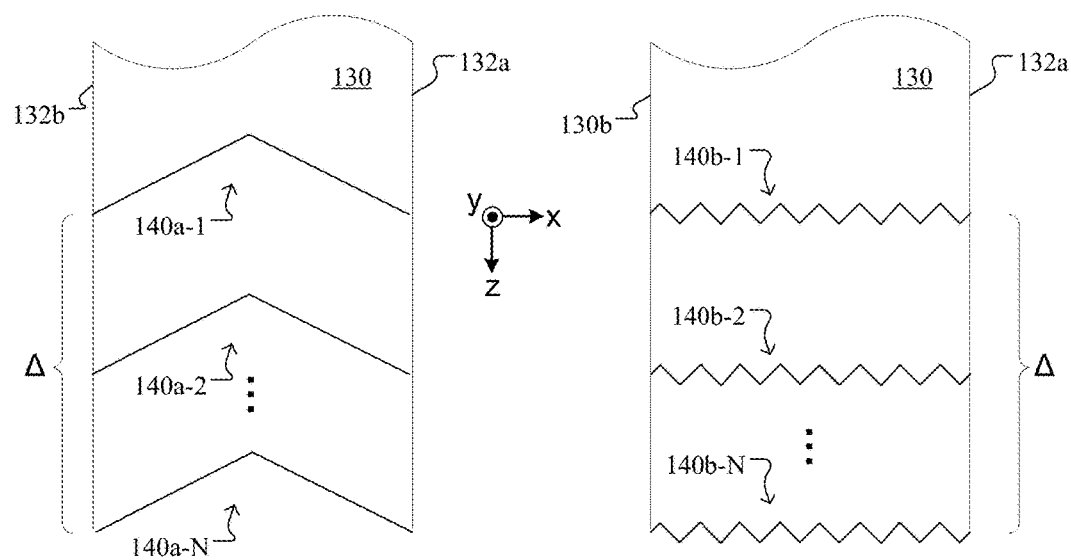
FIGS. 2A-2D illustrate embodiments of the redirecting interfaces of the light guide of the luminaire module illustrated in FIG. 1A.

FIG. 2A shows an implementation 140$a$-$i$, i=1 to N, of the redirecting interfaces of the light guide 130. The last one of the redirecting interfaces is the redirecting end-face 140$a$-N of the light guide 130. Moreover, the redirecting interfaces 140$a$-$i$, i=1 to N, are spaced apart from each other and distributed along the z-axis over a distance Δ of the light guide 130. Here, each redirecting interface 140$a$-$i$ has two planar portions intersecting at an apex. An angle between one of the planar portions and the z-axis is chosen such that substantially all return light reflected off the one of the planar portions of the redirecting interface 140$a$-$i$ propagates only along rays that impinge on the light guide side surface 132$a$ at angles smaller than a critical incident angle. Another angle between the other one of the planar portions and the z-axis is chosen such that substantially all return light reflected off the other one of the planar portions of the redirecting interface 140$a$-$i$ propagates only along rays that impinge on the light guide side surface 132$b$ at angles smaller than the critical incident angle. In this case, a divergence of the return light in each of the corresponding return angular ranges 142$a$-$i$, 142$b$-$i$ is substantially the same as a divergence of the impinging guided light in the angular range 135-$(i-1)$. Further in this case, a relative amount of the return light in the corresponding return angular ranges 142$a$-$i$, 142$b$-$i$ can be varied by laterally displacing the apex formed by the two planar portions of the redirecting interface 140$a$-$i$ with respect to a center axis of the light guide 130.

The redirecting interfaces 140$a$-$i$, i=1 to N, can be fabricated in the following manner, for example. A first redirecting interface 140$a$-1 is fabricated by machining (with optics cutting tools, lasers, etc.) the shape thereof in a first piece of the light guide 130 having a length D-Δ from the input end of the light guide to the machined end. This machining step is followed by forming the first redirecting interface 140$a$-1 with the desired reflectivity and transmissivity by applying or depositing a first appropriate semitransparent coating on the machined end of the first piece. The fabrication process continues by machining a first end of a second piece of the light guide 130 to match the shape of the first redirecting interface 140$a$-1, and by machining a second end of the second piece of the light guide 130 into a shape of a second redirecting interface 140$a$-2. The latter machining step is followed by forming the second redirecting interface 140$a$-2 with the desired reflectivity and transmissivity by applying or depositing a second appropriate semitransparent coating on the machined second end of the second piece. The process continues by attaching the end of the first piece having the formed first redirecting interface 140$a$-1 to the machined first end of the second piece by fusing or gluing the two pieces together. The remaining redirecting interfaces 140$a$-2, 140$a$-3, . . . , 140$a$-N can be fabricated in a similar manner by repeating the process steps described above for fabricating the first redirecting interface 140$a$-1.

FIG. 2B shows another implementation 140$b$-$i$, i=1 to N, of the redirecting interfaces of the light guide 130. The last one of the redirecting interfaces is the redirecting end-face 140$b$-N of the light guide 130. Moreover, the redirecting interfaces 140$b$-$i$, i=1 to N, are spaced apart from each other and distributed along the z-axis over a distance Δ of the light guide 130. Here, each redirecting interface 140$b$-$i$ has multiple pairs of planar portions, each of the pairs of planar portions intersecting at an associated apex. An angle between one planar portion of each of the pairs of planar portions and the z-axis is chosen such that substantially all return light reflected off the one planar portion propagates only along rays that impinge on the light guide side surface 132$a$ at angles smaller than a critical incident angle. Another angle between the other planar portion of each of the planar portions and the z-axis is chosen such that substantially all return light reflected off the other planar portion propagates only along rays that impinge on the light guide side surface 132$b$ at angles smaller than the critical incident angle. In this case, a divergence of the return light in each of the corresponding return angular ranges 142$a$-$i$, 142$b$-$i$ is substantially the same as a divergence of the impinging guided light in the angular range 135-$(i-1)$. Further in this case, a relative amount of the return light in the return angular ranges 142$a$-$i$, 142$b$-$i$ can be varied by varying relative areas of the two planar portions of each pair of planar portions.

The redirecting interfaces 140$b$-$i$, i=1 to N, can be fabricated in a manner similar to the one described above in connection with FIG. 2A for fabricating the redirecting interfaces 140$a$-$i$, i=1 to N.

Figures 2C, 2D:
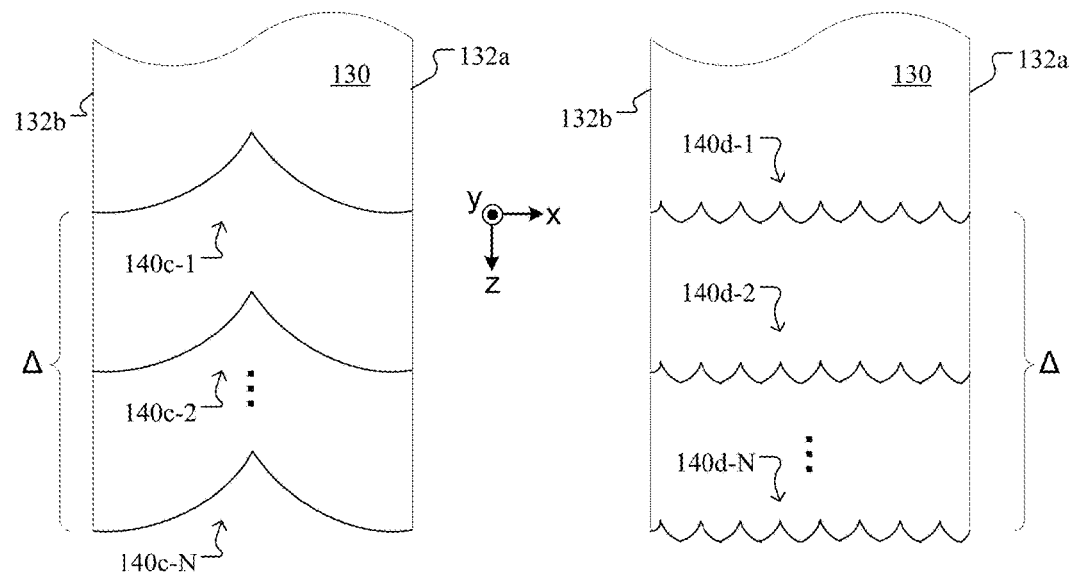

FIG. 2C shows an implementation 140$c$-$i$, i=1 to N, of the redirecting interfaces of the light guide 130. The last one of the redirecting interfaces is the redirecting end-face 140$c$-N of the light guide 130. Moreover, the redirecting interfaces 140$c$-$i$, i=1 to N, are spaced apart from each other and distributed along the z-axis over a distance Δ of the light guide 130. Here, each redirecting interface 140$c$-$i$ has two curved portions intersecting at an apex. The curved portions can be shaped as portions of a parabola, hyperbola, or other curves. An orientation of one of the curved portions relative the z-axis is chosen such that substantially all return light reflected off the one of the curved portions of the redirecting interface 140$c$-$i$ propagates only along rays that impinge on the light guide side surface 132$a$ at angles smaller than a critical incident angle. Another orientation of the other one of the curved portions relative the z-axis is chosen such that substantially all return light reflected off the other one of the curved portions of the redirecting interface 140$c$-$i$ propagates only along rays that impinge on the light guide side surface 132*b* at angles smaller than the critical incident angle. In this case, respective divergences of the return light in the corresponding return angular ranges 142*a-i*, 142*b-i* are smaller/larger than a divergence of the impinging guided light in the angular range 135-($i$–1) if the two curved portions are concave/convex. Further in this case, a relative amount of the return light in the corresponding return angular ranges 142*a-i*, 142*b-i* can be varied by laterally displacing the apex formed by the two curved portions of the redirecting interface 140*c-i* with respect to a center axis of the light guide 130.

The redirecting interfaces 140*c-i*, i=1 to N, can be fabricated in a manner similar to the one described above in connection with FIG. 2A for fabricating the redirecting interfaces 140*a-i*, i=1 to N.

FIG. 2D shows another implementation 140*d-i*, i=1 to N, of the redirecting interfaces of the light guide 130. The last one of the redirecting interfaces is the redirecting end-face 140*d*-N of the light guide 130. Moreover, the redirecting interfaces 140*d-i*, i=1 to N, are spaced apart from each other and distributed along the z-axis over a distance Δ of the light guide 130. Here, each redirecting interface 140*d-i* has multiple pairs of curved portions, each of the pairs of curved portions intersecting at an associated apex. The curved portions can be shaped as portions of a parabola, hyperbola, or other curves. An orientation of one curved portion of each of the pairs of curved portions relative the z-axis is chosen such that substantially all return light reflected off the one curved portion propagates only along rays that impinge on the light guide side surface 132*a* at angles smaller than a critical incident angle. Another orientation of the other curved portion of each of the curved portions relative the z-axis is chosen such that substantially all return light reflected off the other curved portion propagates only along rays that impinge on the light guide side surface 132*b* at angles smaller than the critical incident angle. In this case, respective divergences of the return light in the corresponding return angular ranges 142*a-i*, 142*b-i* are smaller/larger than a divergence of the impinging guided light in the angular range 135-($i$–1) if the two curved portions of each of the pairs of curved portions are concave/convex. Further in this case, a relative amount of the return light in the corresponding return angular ranges 142*a-i*, 142*b-i* can be varied by varying relative areas of the two curved portions of each pair of curved portions.

The redirecting interfaces 140*d-i*, i=1 to N, can be fabricated in a manner similar to the one described above in connection with FIG. 2A for fabricating the redirecting interfaces 140*a-i*, i=1 to N.

A ray-based description of the interaction between light guided through the light guide 130 and the redirecting interfaces 140-*i*, i=1 to N, of the light guide is presented next. For the purposes of this description, each of the redirecting interfaces 140-*i*, i=1 to N, illustrated in FIG. 1A has one of the configurations 140*a-i*, 140*b-i*, 140*c-i* or 140*d-i* described above in connection with FIGS. 2A-2D. In other implementations (not illustrated in FIG. 1A), at least some of the redirecting interfaces 140-*i*, i=1 to N, have different ones of the configurations 140*a-i*, 140*b-i*, 140*c-i* or 140*d-i* described above in connection with FIGS. 2A-2D, or other configurations.

Light propagating through the light guide 130 in the forward direction from the input end has an angular range 135-0 when it impinges on the first redirecting interface 140*a*-1, 140*b*-1, 140*c*-1 or 140*d*-1. In some implementations, the angular range 135-0 can be substantially equal to the second angular range 125.

Return light generated by reflection off of the first redirecting interface 140*a*-1, 140*b*-1, 140*c*-1 or 140*d*-1 in a first instance of the first return angular range 142*a*-1 impinges on the light guide side surface 132*a* at point Pa-1 and most of it transmits through the light guide side surface 132*a* as output light in a first instance of first side angular range 152*a*-1. A prevalent propagation direction within the first instance of the first side angular range 152*a*-1 can be (i) orthogonal to the light guide side surface 132*a* when a prevalent propagation direction within the first instance of the first return angular range 142*a*-1 is normal to the light guide side surface 132*a*; (ii) along the light guide side surface 132*a* (antiparallel to the z-axis) when the prevalent propagation direction within the first instance of the first return angular range 142*a*-1 is along a ray that impinges on the light guide side surface 132*a* at critical angle incidence; and (iii) anywhere in-between normal on the light guide side surface 132*a* (perpendicular to the z-axis) and parallel to the light guide side surface 132*a* (antiparallel to the z-axis) when the prevalent propagation direction within the first instance of the first return angular range 142*a*-1 is along a ray that impinges on the light guide side surface 132*a* between normal and critical angle incidence.

Return light generated by reflection off of the first redirecting interface 140*a*-1, 140*b*-1, 140*c*-1 or 140*d*-1 in a first instance of the second return angular range 142*b*-1 impinges on the light guide side surface 132*b* at point Pb-1 and most of it transmits through the light guide side surface 132*b* as output light in a first instance of second side angular range 152*b*-1. A prevalent propagation direction within the first instance of the second side angular range 152*b*-1 can be (i) orthogonal to the light guide side surface 132*b* when a prevalent propagation direction within the first instance of the second return angular range 142*b*-1 is normal to the light guide side surface 132*b*; (ii) along the light guide side surface 132*b* (antiparallel to the z-axis) when the prevalent propagation direction within the first instance of the second return angular range 142*b*-1 is along a ray that impinges on the light guide side surface 132*b* at critical angle incidence; and (iii) anywhere in-between normal on the light guide side surface 132*b* (perpendicular to the z-axis) and parallel to the light guide side surface 132*b* (antiparallel to the z-axis) when the prevalent propagation direction within the first instance of the second return angular range 142*b*-1 is along a ray that impinges on the light guide side surface 132*b* between normal and critical angle incidence.

Light transmitted through the first redirecting interface 140*a*-1, 140*b*-1, 140*c*-1 or 140*d*-1 into an angular range 135-1 is guided by the light guide 130 in the forward direction. In some implementations of the first redirecting interface 140*a*-1, 140*b*-1, 140*c*-1 or 140*d*-1, the angular range 135-1 of the transmitted light can be substantially equal to the angular range 135-0 of the incident light. Moreover, the guided light has the angular range 135-1 when it impinges on the second redirecting interface 140*a*-2, 140*b*-2, 140*c*-2 or 140*d*-2.

Return light generated by reflection off of the second redirecting interface 140*a*-2, 140*b*-2, 140*c*-2 or 140*d*-2 in a second instance of the first return angular range 142*a*-2 impinges on the light guide side surface 132*a* at point Pa-2 and most of it transmits through the light guide side surface 132*a* as output light in a second instance of first side angular range 152*a*-2. In this example, a prevalent direction of propagation direction within and a divergence of the second instance of the first return angular range 142*a*-2 are equal to the corresponding ones of the first instance of the first return angular range 142*a*-1. Hence, a prevalent propagation direction within and a divergence of the second instance of the first side angular range 152a-2 are equal to the corresponding ones of the first instance of the first side angular range 152a-1.

Return light generated by reflection off of the second redirecting interface 140a-2, 140b-2, 140c-2 or 140d-2 in a second instance of the second return angular range 142b-2 impinges on the light guide side surface 132b at point Pb-2 and most of it transmits through the light guide side surface 132b as output light in a second instance of second side angular range 152b-2. In this example, a prevalent direction of propagation direction within and a divergence of the second instance of the second return angular range 142b-2 are equal to the corresponding ones of the first instance of the second return angular range 142b-1. Hence, a prevalent propagation direction within and a divergence of the second instance of the second side angular range 152b-2 are equal to the corresponding ones of the first instance of the second side angular range 152b-1.

Light transmitted through the second redirecting interface 140a-2, 140b-2, 140c-2 or 140d-2 into an angular range 135-2 is guided by the light guide 130 in the forward direction. In this example, the angular range 135-2 of the transmitted light is substantially equal to the angular range 135-1 of the incident light. Moreover, the guided light has the angular range 135-2 when it impinges on the third redirecting interface 140a-3, 140b-3, 140c-3 or 140d-3.

Return light generated by reflection off of the third redirecting interface 140a-3, 140b-3, 140c-3 or 140d-3 in a third instance of the first return angular range 142a-3 impinges on the light guide side surface 132a at point Pa-3 and most of it transmits through the light guide side surface 132a as output light in a third instance of first side angular range 152a-3. In this example, a prevalent direction of propagation direction within and a divergence of the third instance of the first return angular range 142a-3 are equal to the corresponding ones of the second instance of the first return angular range 142a-2. Hence, a prevalent propagation direction within and a divergence of the third instance of the first side angular range 152a-3 are equal to the corresponding ones of the second instance of the first side angular range 152a-2.

Return light generated by reflection off of the third redirecting interface 140a-3, 140b-3, 140c-3 or 140d-3 in a third instance of the second return angular range 142b-3 impinges on the light guide side surface 132b at point Pb-3 and most of it transmits through the light guide side surface 132b as output light in a third instance of second side angular range 152b-3. In this example, a prevalent direction of propagation direction within and a divergence of the third instance of the second return angular range 142b-3 are equal to the corresponding ones of the second instance of the second return angular range 142b-2. Hence, a prevalent propagation direction within and a divergence of the third instance of the second side angular range 152b-3 are equal to the corresponding ones of the second instance of the second side angular range 152b-2.

Light transmitted through the third redirecting interface 140a-3, 140b-3, 140c-3 or 140d-3 into an angular range 135-3 (not shown in FIG. 1A) is guided by the light guide 130 in the forward direction. In this example, the angular range 135-3 of the transmitted light is substantially equal to the angular range 135-2 of the incident light. The light propagating through the light guide further interacts with the remaining redirecting surfaces in a similar manner to the ones described above. Hence, the guided light has an angular range 135-(N−1) when it impinges on the redirecting end-face 140a-N, 140b-N, 140c-N or 140d-N.

Return light generated by reflection off of the redirecting end-face 140a-N, 140b-N, 140c-N or 140d-N in a $N^{th}$ instance of the first return angular range 142a-N impinges on the light guide side surface 132a at point Pa-N and most of it transmits through the light guide side surface 132a as output light in a $N^{th}$ instance of first side angular range 152a-N. In this example, a prevalent direction of propagation direction within and a divergence of the $N^{th}$ instance of the first return angular range 142a-N are equal to the corresponding ones of the $(N-1)^{th}$ instance of the first return angular range 142a-(N−1). Hence, a prevalent propagation direction within and a divergence of the $N^{th}$ instance of the first side angular range 152a-N are equal to the corresponding ones of the $(N-1)^{th}$ instance of the first side angular range 152a-(N−1).

Return light generated by reflection off of the redirecting end-face 140a-N, 140b-N, 140c-N or 140d-N in a $N^{th}$ instance of the second return angular range 142b-N impinges on the light guide side surface 132b at point Pb-N and most of it transmits through the light guide side surface 132b as output light in a $N^{th}$ instance of second side angular range 152b-N. In this example, a prevalent direction of propagation direction within and a divergence of the $N^{th}$ instance of the second return angular range 142b-N are equal to the corresponding ones of the $(N-1)^{th}$ instance of the second return angular range 142b-(N−1). Hence, a prevalent propagation direction within and a divergence of the $N^{th}$ instance of the second side angular range 152b-N are equal to the corresponding ones of the $(N-1)^{th}$ instance of the second side angular range 152b-(N−1).

Light transmitted through the redirecting end-face 140a-N, 140b-N, 140c-N or 140d-N outside of the light guide 130 in the forward direction (along the +z axis) represents output light provided by the luminaire module 100 in the third output angular range 145. In some implementations, the third output angular range 145 of the output light is different from the angular range 135-(N−1) of the incident light.

In this manner, light output by the luminaire module 100—equipped with a light guide 130 having anyone of the sets of the redirecting interfaces 140a-i, 140b-i, 140c-i or 140d-i, where i=1 to N—through the light guide side surface 132a in a resultant first output angular range 152a is a combination of light transmitted through the light guide side surface 132a in the first, second, third, . . . , $N^{th}$ instances of the first side angular range 152a-1, 152a-2, 152a-3, . . . , 152a-N. Similarly, light output by this implementation of the luminaire module 100 through the light guide side surface 132b in a resultant second output angular range 152b is a combination of light transmitted through the light guide side surface 132b in the first, second, third, . . . , $N^{th}$ instances of the second side angular range 152b-1, 152b-2, 152b-3, . . . , 152b-N.

In some implementations, a reflectivity $R_i$ of a redirecting interface 140-i (having one or more of the configurations 140a-i, 140b-i, 140c-i or 140d-i) is chosen to be $R_i=1/(N+2-i)$, where i=1 to N, such that return light from each of the N redirecting interfaces emerges through the first and second light guide side surfaces 132a, 132b in instances of the first and second output angular ranges 152a-i, 152b-i with equal intensities. For example, N=4 for a luminaire module with four redirecting interfaces. Here, the first redirecting interface 140-1 has a reflectivity $R_1=1/5=0.2$. If light with intensity $I_0$ is guided to the first redirecting interface 140-1, then the light returned by the first redirecting interface 140-1 has an intensity $I_{R1}=0.2I_0$, while the light transmitted through the first redirecting interface 140-1 has an intensity $I_{T1}=I_0-I_{R1}=0.8I_0$. In this example, half of the light returned from the first redirecting interface 140-1 emerges from the light guide 130 through the first light guide side surface 132a within a first instance of the first output angular range 152a-1 with intensity $I_{a1}=0.5I_{R1}=0.1I_0$, and the other half of the light returned from the first redirecting interface 140-1 emerges from the light guide 130 through the second light guide side surface 132b within a first instance of the second output angular range 152b-1 with intensity $I_{B1}=0.5I_{R1}=0.1I_0$. Further, the second redirecting interface 140-2 has a reflectivity $R_2=\frac{1}{4}=0.25$. Here, light transmitted through the first redirecting interface 140-1 with intensity $0.8I_0$ is guided to the second redirecting interface 140-2. As such, the light returned by the second redirecting interface 140-2 has an intensity $I_{R2}=0.25*0.8I_0=0.2I_0$, while the light transmitted through the second redirecting interface 140-2 has an intensity $I_{T2}=0.8I_0-I_{R2}=0.6I_0$. In this example, half of the light returned from the second redirecting interface 140-2 emerges from the light guide 130 through the first light guide side surface 132a within a second instance of the first output angular range 152a-2 with intensity $I_{a2}=0.5I_{R2}=0.1I_0$, and the other half of the light returned from the second redirecting interface 140-2 emerges from the light guide 130 through the second light guide side surface 132b within a second instance of the second output angular range 152b-2 with intensity $I_{b2}=0.5I_{R2}=0.1I_0$. Furthermore, the third redirecting interface 140-3 has a reflectivity $R3=\frac{1}{3}$. Here, light transmitted through the second redirecting interface 140-2 with intensity $0.6I_0$ is guided to the third redirecting interface 140-3. As such, the light returned by the third redirecting interface 140-3 has an intensity $I_{R3}=(\frac{1}{3})*0.6I_0=0.2I_0$, while the light transmitted through the third redirecting interface 140-3 has an intensity $I_{T3}=0.6I_0-I_{R3}=0.4I_0$. In this example, half of the light returned from the third redirecting interface 140-3 emerges from the light guide 130 through the first light guide side surface 132a within a third instance of the first output angular range 152a-3 with intensity $I_{a3}=0.5I_{R3}=0.1I_0$, and the other half of the light returned from the third redirecting interface 140-3 emerges from the light guide 130 through the second light guide side surface 132b within a third instance of the second output angular range 152b-3 with intensity $I_{b3}=0.5I_{R3}=0.1I_0$. Finally, the fourth redirecting interface 140-4 has a reflectivity $R_4=\frac{1}{2}=0.5$. Here, light transmitted through the third redirecting interface 140-3 with intensity $0.4I_0$ is guided to the fourth redirecting interface 140-4. As such, the light returned by the fourth redirecting interface 140-4 has an intensity $I_{R4}=0.5*0.4I_0=0.2I_0$, while the light transmitted through the fourth redirecting interface 140-4 has an intensity $I_{T4}=0.4I_0-I_{R4}=0.2I_0$. In this example, half of the light returned from the fourth redirecting interface 140-4 emerges from the light guide 130 through the first light guide side surface 132a within a fourth instance of the first output angular range 152a-4 with intensity $I_{a4}=0.5I_{R4}=0.1I_0$, and the other half of the light returned from the fourth redirecting interface 140-4 emerges from the light guide 130 through the second light guide side surface 132b within a fourth instance of the second output angular range 152b-4 with intensity $I_{b4}=0.5I_{R4}=0.1I_0$. Note that in this example, $I_{a1}=I_{a2}=I_{a3}=I_{a4}=I_{b1}=I_{b2}=I_{b3}=I_{b4}=0.1I_0$, such that uniform light is extracted through the light guide side surfaces 132a, 132b over a portion of length $\Delta$ of the light guide 130.

In other implementations, a reflectivity $R_i$ of a redirecting interface 140-i (having one or more of the configurations 140a-i, 140b-i, 140c-i or 140d-i) is chosen to be the same, $R_i=R$, for all i=1 to N, such that return light from the N redirecting interfaces emerges through the first and second light guide side surfaces 132a, 132b in instances of the first and second output angular ranges 152a-i, 152b-i with decreasing intensities. For example, N=4 for a luminaire module with four redirecting interfaces. Here, the first redirecting interface 140-1 has a reflectivity R=0.5. If light with intensity $I_0$ is guided to the first redirecting interface 140-1, then the light returned by the first redirecting interface 140-1 has an intensity $I_{R1}=0.5I_0$, while the light transmitted through the first redirecting interface 140-1 has an intensity $I_{T1}=I_0-I_{R1}=0.5I_0$. In this example, half of the light returned from the first redirecting interface 140-1 emerges from the light guide 130 through the first light guide side surface 132a within a first instance of the first output angular range 152a-1 with intensity $I_{a1}=0.5I_{R1}=0.25I_0$, and the other half of the light returned from the first redirecting interface 140-1 emerges from the light guide 130 through the second light guide side surface 132b within a first instance of the second output angular range 152b-1 with intensity $I_{b1}=0.5I_{R1}=0.25I_0$. Further, the second redirecting interface 140-2 has a reflectivity R=0.5. Here, light transmitted through the first redirecting interface 140-1 with intensity $0.5I_0$ is guided to the second redirecting interface 140-2. As such, the light returned by the second redirecting interface 140-2 has an intensity $I_{R2}=0.5*0.5I_0=0.25I_0$, while the light transmitted through the second redirecting interface 140-2 has an intensity $I_{T2}=0.5I_0-I_{R2}=0.25I_0$. In this example, half of the light returned from the second redirecting interface 140-2 emerges from the light guide 130 through the first light guide side surface 132a within a second instance of the first output angular range 152a-2 with intensity $I_{a2}=0.5I_{R2}=0.125I_0$, and the other half of the light returned from the second redirecting interface 140-2 emerges from the light guide 130 through the second light guide side surface 132b within a second instance of the second output angular range 152b-2 with intensity $I_{b2}=0.5I_{R2}=0.125I_0$. Furthermore, the third redirecting interface 140-3 has a reflectivity R=0.5. Here, light transmitted through the second redirecting interface 140-2 with intensity $0.25I_0$ is guided to the third redirecting interface 140-3. As such, the light returned by the third redirecting interface 140-3 has an intensity $I_{R3}=0.5*0.25I_0=0.125I_0$, while the light transmitted through the third redirecting interface 140-3 has an intensity $I_{T3}=0.25I_0-I_{R3}=0.125I_0$. In this example, half of the light returned from the third redirecting interface 140-3 emerges from the light guide 130 through the first light guide side surface 132a within a third instance of the first output angular range 152a-3 with intensity $I_{a3}=0.5I_{R3}=0.0625I_0$, and the other half of the light returned from the third redirecting interface 140-3 emerges from the light guide 130 through the second light guide side surface 132b within a third instance of the second output angular range 152b-3 with intensity $I_{b3}=0.5I_{R3}=0.0625I_0$. Finally, the fourth redirecting interface 140-4 has a reflectivity R=0.5. Here, light transmitted through the third redirecting interface 140-3 with intensity $0.125I_0$ is guided to the fourth redirecting interface 140-4. As such, the light returned by the fourth redirecting interface 140-4 has an intensity $I_{R4}=0.5*0.125I_0=0.0625I_0$, while the light transmitted through the fourth redirecting interface 140-4 has an intensity $I_{T4}=0.125I_0-I_{R4}=0.0625I_0$. In this example, half of the light returned from the fourth redirecting interface 140-4 emerges from the light guide 130 through the first light guide side surface 132a within a fourth instance of the first output angular range 152a-4 with intensity $I_{a4}=0.5I_{R4}=0.03125I_0$, and the other half of the light returned from the fourth redirecting interface 140-4 emerges from the light guide 130 through the second light guide side surface 132b within a fourth instance of the second output angular range 152b-4 with intensity $I_{b4}=0.5I_{R4}=0.03125I_0$. Note that in this example, $I_{a1}=0.25I_0$, $I_{a2}=0.125I_0$, $I_{a3}=0.0625I_0$, $I_{a4}=0.03125I_0$, such that the intensity of the light output through the first light guide side surface 132a decreases over a portion of length Δ of the light guide 130. Further note that $I_{b1}=0.25I_0$, $I_{b2}=0.125I_0$, $I_{b3}=0.0625I_0$, $I_{b4}=0.03125I_0$, such that the intensity of the light output through the second light guide side surface 132b decreases over a portion of length Δ of the light guide 130 in the same manner as the light output through the first light guide side surface 132a.

In yet other implementations, other reflectivities Ri of the redirecting interfaces 140-i, i=1 to N, (having one or more of the configurations 140a-i, 140b-i, 140c-i or 140d-i) can be chosen.

Figure 2E:
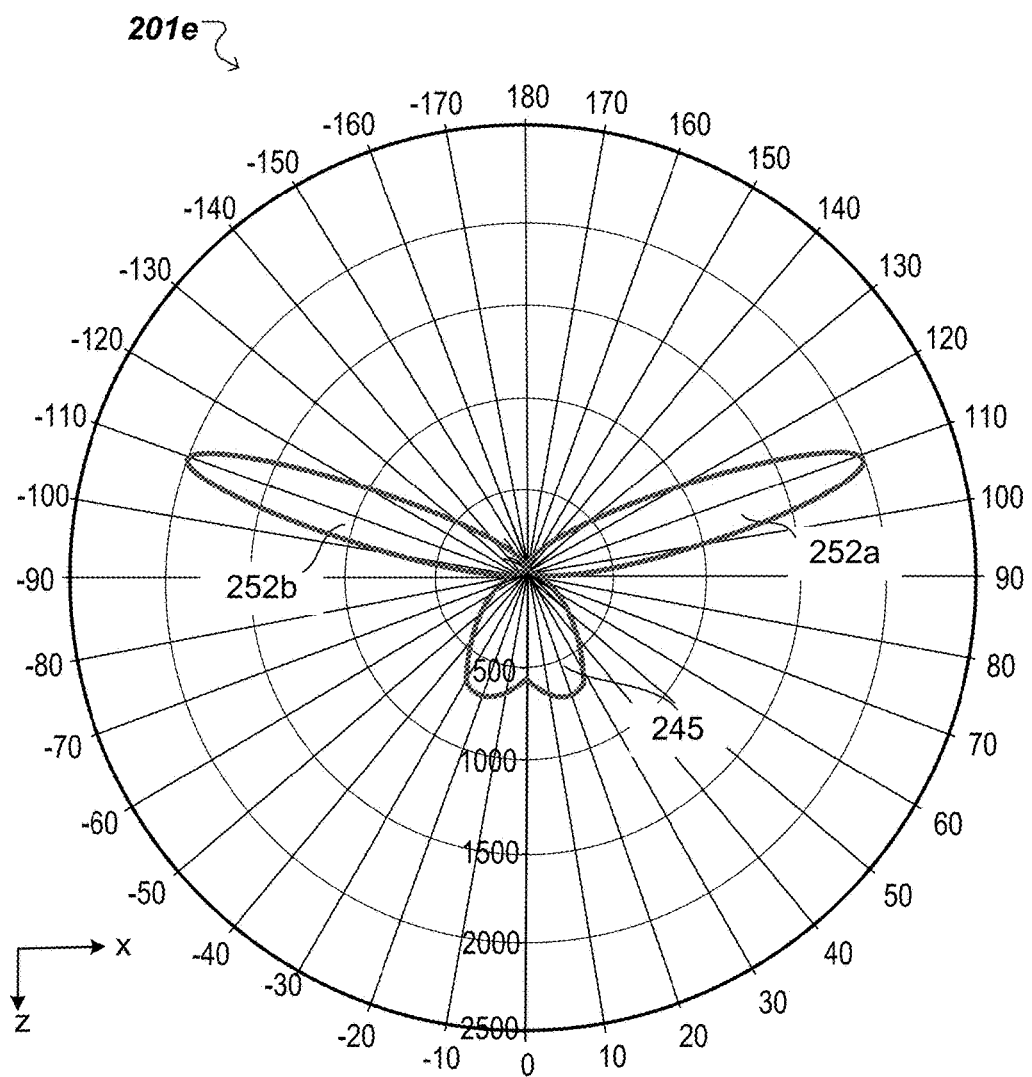
FIGS. 2E-2F illustrate light intensity distributions corresponding to the luminaire module of FIG. 1A having the light guide with the redirecting interfaces illustrated in FIGS. 2A-2D.

FIG. 2E shows a far-field intensity distribution 201c of light output by the luminaire module 100 in the x-z cross-section. Here, the luminaire module 100 is equipped with anyone of the sets of redirecting interfaces 140a-i, 140b-i, 140c-i or 140d-i, where i=1 to N, and the redirecting end-face 140a-N, 140b-N, 140c-N or 140d-N has a coating of semitransparent material or a reflecting coating that has apertures (or semitransparent) portions. Lobe 252a corresponds to output light transmitted through the light guide side surface 132a in the first output angular range 152a. Lobe 252b corresponds to output light transmitted through the light guide side surface 132b in the second output angular range 152b. Lobe 245 corresponds to output light transmitted through the redirecting end-face 140a-N, 140b-N, 140c-N or 140d-N in the third output angular range 145.

An orientation of the lobe 252a (e.g., with respect to the z-axis) and a shape of thereof (e.g., aspect ratio of the lobe 252a) depends mostly on respective propagation direction and divergence of the return light in instances of the first return angular range 142a-i, i=1 to N, (due to transmissions at points $P_a$-1, $P_a$-2, . . . , Pa-N.) Similarly, an orientation of the lobe 252b (e.g., with respect to the z-axis) and a shape of thereof (e.g., aspect ratio of the lobe 252b) depends mostly on respective propagation direction and divergence of the return light in instances of the second return angular range 142b-i, i=1 to N, (due to transmissions at points $P_b$-1, $P_b$-2, . . . , $P_b$-N.) As described above, the propagation directions and divergences of the return light in the instances of the first and second return angular ranges 142a-i, 142b-i depend on the structure of each of embodiments 140a-i, 140b-i, 140c-i or 140d-i, i=1 to N, of the redirecting interfaces. An orientation of the lobe 245 (e.g., with respect to the z-axis) and a shape of thereof (e.g., batwing) depend on (i) collimating characteristics of the one or more couplers 120, and (ii) guiding characteristics of the light guide 130. Relative sizes of the lobes 252a, 252b and 245 depend on a combination of (i) reflectance of coatings of the redirecting interfaces 140-i, and (ii) structure of the embodiments 140a-i, 140b-i, 140c-i or 140d-i, i=1 to N, of the redirecting interfaces.

Figure 2F:
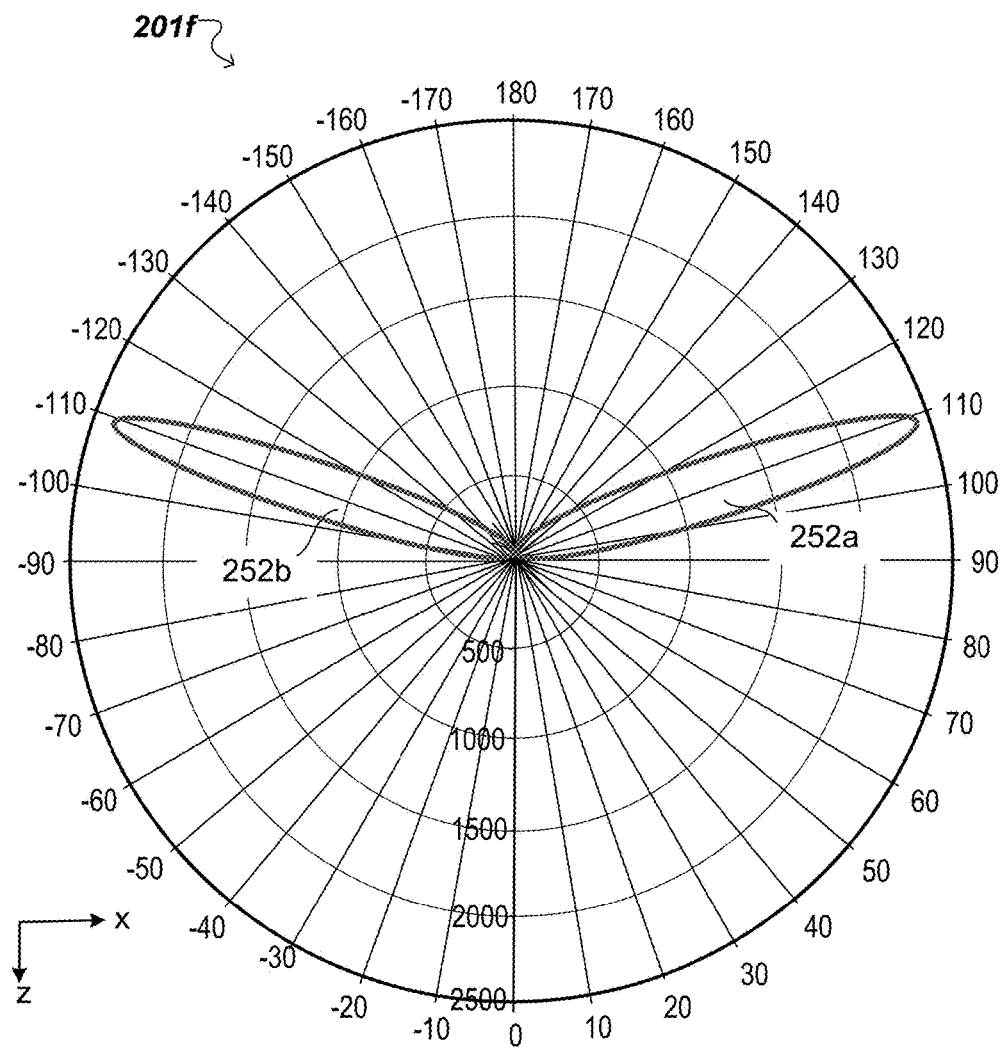

FIG. 2F shows an intensity distribution 201f of light output by the luminaire module 100 in the x-z cross-section. Here, the luminaire module 100 is equipped with anyone of the sets of the redirecting interfaces 140a-i, 140b-i, 140c-i or 140d-i, where i=1 to N, and the redirecting end-face 140a-N, 140b-N, 140c-N or 140d-N has a reflecting coating (with reflectance higher than 98%, for instance.) Lobe 252a corresponds to output light transmitted through the light guide side surface 132a in the first output angular range 152a, and lobe 252b corresponds to output light transmitted through the light guide side surface 132b in the second output angular range 152b.

An orientation of the lobe 252a (e.g., with respect to the z-axis) and a shape of thereof (e.g., aspect ratio of the lobe 252a) depends mostly on respective propagation direction and divergence of the return light in instances of the first return angular range 142a-i, i=1 to N, (due to transmissions at points $P_a$-1, $P_a$-2, . . . , $P_a$-N.) Similarly, an orientation of the lobe 252b (e.g., with respect to the z-axis) and a shape of thereof (e.g., aspect ratio of the lobe 252b) depends mostly on respective propagation direction and divergence of the return light in instances of the second return angular range 142b-i, i=1 to N, (due to transmissions at points $P_b$-1, $P_b$-2, . . . , $P_b$-N.) As described above, the propagation directions and divergences of the return light in the instances of the first and second return angular ranges 142a-i, 142b-i depend on the structure of each of embodiments 140a-i, 140b-i, 140c-i or 140d-i, i=1 to N, of the redirecting interfaces. Relative sizes of the lobes 252a and 252b depend on structure of the embodiments 140a-i, 140b-i, 140c-i or 140d-i, i=1 to N, of the redirecting interfaces.

Embodiments of the redirecting interfaces 140-i with interface structure that causes the return light to propagate in both sets of instances of the return angular ranges 142a-i and 142b-i, i=1 to N, along with corresponding intensity distributions of output light were described above. Embodiments of the redirecting interfaces 140-i with interface structure that causes the return light to propagate substantially in a single set of instances of the return angular range 142a-i, i=1 to N, along with corresponding intensity distributions of output light are described next. In these embodiments, the interface structure includes one or more asymmetric v-grooves or an asymmetric sawtooth pattern. Here, walls of the asymmetric sawtooth pattern can be planar or curved.

Figure 3A:
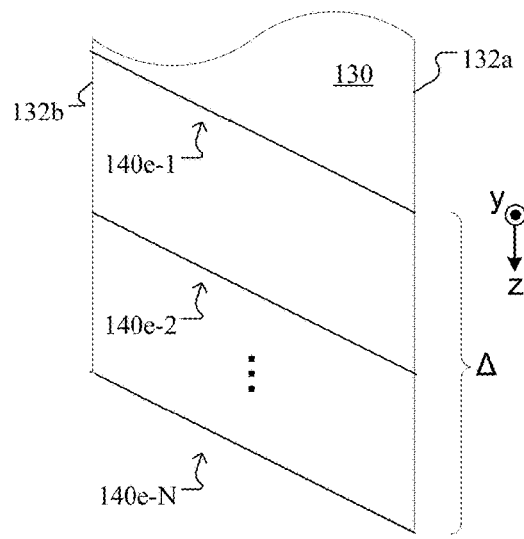
FIGS. 3A-3D illustrate other embodiments of the redirecting interfaces of the light guide of the luminaire module illustrated in FIG. 1A.

FIG. 3A shows an implementation 140e-i, i=1 to N, of the redirecting interfaces of the light guide 130. The last one of the redirecting interfaces is the redirecting end-face 140e-N of the light guide 130. Moreover, the redirecting interfaces 140e-i, i=1 to N, are spaced apart from each other and distributed along the z-axis over a distance Δ of the light guide 130. Here, each redirecting interface 140e-i is planar and forms an angle relative the z-axis that is chosen such that substantially all return light reflected off the planar redirecting interface 140e-i propagates only along rays that impinge on the light guide side surface 132a at angles smaller than a critical incident angle. In this case, a divergence of the return light in the corresponding return angular range 142a-i is substantially the same as a divergence of the impinging guided light in the angular range 135-(i−1).

The redirecting interfaces 140e-i, i=1 to N, can be fabricated in a manner similar to the one described above in connection with FIG. 2A for fabricating the redirecting interfaces 140a-i, i=1 to N.

Figure 3B:
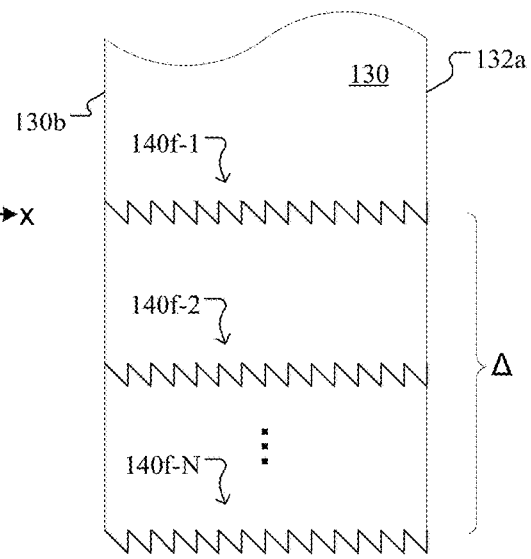

FIG. 3B shows another implementation 140f-i, i=1 to N, of the redirecting interfaces of the light guide 130. The last one of the redirecting interfaces is the redirecting end-face 140f-N of the light guide 130. Moreover, the redirecting interfaces 140f-i, i=1 to N, are spaced apart from each other and distributed along the z-axis over a distance Δ of the light guide 130. Here, each redirecting interface 140f-i has multiple planar portions, each of the planar portions forms an angle relative the z-axis that is chosen such that substantially all return light reflected off each of the planar portions propagates only along rays that impinge on the light guide side surface 132a at angles smaller than a critical incident angle. In this case, a divergence of the return light in the corresponding return angular range 142*a-i* is substantially the same as a divergence of the impinging guided light in the angular range 135-($i$–1).

The redirecting interfaces 140*f-i*, i=1 to N, can be fabricated in a manner similar to the one described above in connection with FIG. 2A for fabricating the redirecting interfaces 140*a-i*, i=1 to N.

Figure 3C:
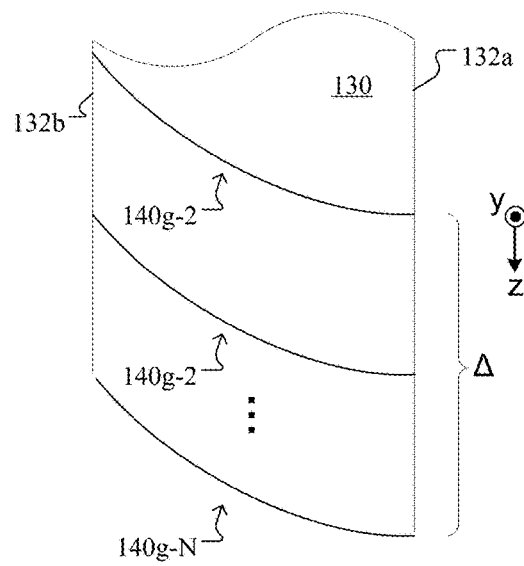

FIG. 3C shows an implementation 140*g-i*, i=1 to N, of the redirecting interfaces of the light guide 130. The last one of the redirecting interfaces is the redirecting end-face 140*g*-N of the light guide 130. Moreover, the redirecting interfaces 140*g-i*, i=1 to N, are spaced apart from each other and distributed along the z-axis over a distance Δ of the light guide 130. Here, each redirecting interface 140*g-i* is curved and oriented relative the z-axis such that substantially all return light reflected off the curved redirecting interface 140*g-i* propagates only along rays that impinge on the light guide side surface 132*a* at angles smaller than a critical incident angle. The curved redirecting interface 140*g-i* can be shaped as a portion of a parabola, hyperbola, or other curves. In this case, respective a divergence of the return light in the corresponding return angular range 142*a-i* is smaller/larger than a divergence of the impinging guided light in the angular range 135-($i$–1) if the curved redirecting interface 140*g-i* is concave/convex.

The redirecting interfaces 140*g-i*, i=1 to N, can be fabricated in a manner similar to the one described above in connection with FIG. 2A for fabricating the redirecting interfaces 140*a-i*, i=1 to N.

Figure 3D:
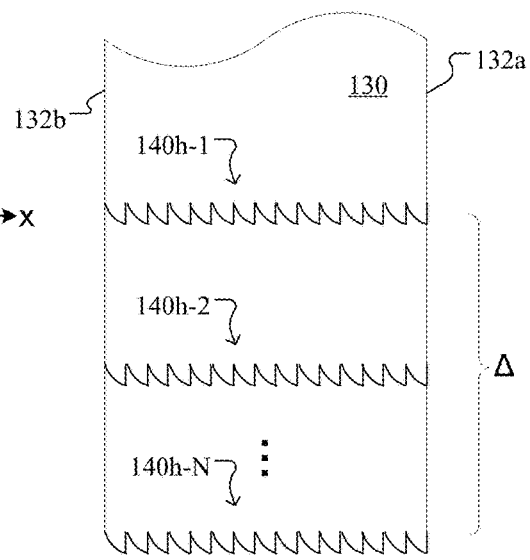

FIG. 3D shows another implementation 140*h-i*, i=1 to N, of the redirecting interfaces of the light guide 130. The last one of the redirecting interfaces is the redirecting end-face 140*h*-N of the light guide 130. Moreover, the redirecting interfaces 140*h-i*, i=1 to N, are spaced apart from each other and distributed along the z-axis over a distance Δ of the light guide 130. Here, each redirecting interface 140*h-i* has multiple curved portions, each of the curved portions orientated such that substantially all return light reflected off each of the curved portions propagates only along rays that impinge on the light guide side surface 132*a* at angles smaller than a critical incident angle. The curved portions can be shaped as portions of a parabola, hyperbola, or other curves. In this case, a divergence of the return light in the corresponding return angular range 142*a-i* is smaller/larger than a divergence of the impinging guided light in the angular range 135-($i$–1) if the curved portions are concave/convex.

The redirecting interfaces 140*h-i*, i=1 to N, can be fabricated in a manner similar to the one described above in connection with FIG. 2A for fabricating the redirecting interfaces 140*a-i*, i=1 to N.

Another ray-based description of the interaction between light guided through the light guide 130 and the redirecting interfaces 140-*i*, i=1 to N, of the light guide is presented next. For the purposes of the following description, each of the redirecting interfaces 140-*i*, i=1 to N, illustrated in FIG. 1A has one of the configurations 140*e-i*, 140*f-i*, 140*g-i* or 140*h-i* described above in connection with FIGS. 3A-3D. In other implementations (not illustrated in FIG. 1A), at least some of the redirecting interfaces 140-*i*, i=1 to N, have different ones of the configurations 140*e-i*, 140*f-i*, 140*g-i* or 140*h-i* described above in connection with FIGS. 3A-3D, or other configurations.

Light propagating through the light guide 130 in the forward direction from the input end has an angular range 135-0 when it impinges on the first redirecting interface 140*e*-1, 140*f*-1, 140*g*-1 or 140*h*-1. In some implementations, the angular range 135-0 can be substantially equal to the second angular range 125.

Return light generated by reflection off of the first redirecting interface 140*e*-1, 140*f*-1, 140*g*-1 or 140*h*-1 in a first instance of the first return angular range 142*a*-1 impinges on the light guide side surface 132*a* at point P$_a$-1 and most of it transmits through the light guide side surface 132*a* as output light in a first instance of first side angular range 152*a*-1. A prevalent propagation direction within the first instance of the first side angular range 152*a*-1 can be (i) orthogonal to the light guide side surface 132*a* when a prevalent propagation direction within the first instance of the first return angular range 142*a*-1 is normal to the light guide side surface 132*a*; (ii) along the light guide side surface 132*a* (antiparallel to the z-axis) when the prevalent propagation direction within the first instance of the first return angular range 142*a*-1 is along a ray that impinges on the light guide side surface 132*a* at critical angle incidence; and (iii) anywhere in-between normal on the light guide side surface 132*a* (perpendicular to the z-axis) and parallel to the light guide side surface 132*a* (antiparallel to the z-axis) when the prevalent propagation direction within the first instance of the first return angular range 142*a*-1 is along a ray that impinges on the light guide side surface 132*a* between normal and critical angle incidence.

Light transmitted through the first redirecting interface 140*e*-1, 140*f*-1, 140*g*-1 or 140*h*-1 into an angular range 135-1 is guided by the light guide 130 in the forward direction. In some implementations of the first redirecting interface 140*e*-1, 140*f*-1, 140*g*-1 or 140*h*-1, the angular range 135-1 of the transmitted light can be substantially equal to the angular range 135-0 of the incident light. Moreover, the guided light has the angular range 135-1 when it impinges on the second redirecting interface 140*e*-2, 140*f*-2, 140*g*-2 or 140*h*-2.

Return light generated by reflection off of the second redirecting interface 140*e*-2, 140*f*-2, 140*g*-2 or 140*h*-2 in a second instance of the first return angular range 142*a*-2 impinges on the light guide side surface 132*a* at point Pa-2 and most of it transmits through the light guide side surface 132*a* as output light in a second instance of first side angular range 152*a*-2. In this example, a prevalent direction of propagation direction within and a divergence of the second instance of the first return angular range 142*a*-2 are equal to the corresponding ones of the first instance of the first return angular range 142*a*-1. Hence, a prevalent propagation direction within and a divergence of the second instance of the first side angular range 152*a*-2 are equal to the corresponding ones of the first instance of the first side angular range 152*a*-1.

Light transmitted through the second redirecting interface 140*e*-2, 140*f*-2, 140*g*-2 or 140*h*-2 into an angular range 135-2 is guided by the light guide 130 in the forward direction. In this example, the angular range 135-2 of the transmitted light is substantially equal to the angular range 135-1 of the incident light. Moreover, the guided light has the angular range 135-2 when it impinges on the third redirecting interface 140*e*-3, 140*f*-3, 140*g*-3 or 140*h*-3.

Return light generated by reflection off of the third redirecting interface 140*e*-3, 140*f*-3, 140*g*-3 or 140*h*-3 in a third instance of the first return angular range 142*a*-3 impinges on the light guide side surface 132*a* at point Pa-3 and most of it transmits through the light guide side surface 132*a* as output light in a third instance of first side angular range 152*a*-3. In this example, a prevalent direction of propagation direction within and a divergence of the third instance of the first return angular range 142a-3 are equal to the corresponding ones of the second instance of the first return angular range 142a-2. Hence, a prevalent propagation direction within and a divergence of the third instance of the first side angular range 152a-3 are equal to the corresponding ones of the second instance of the first side angular range 152a-2.

Light transmitted through the third redirecting interface 140e-3, 140f-3, 140g-3 or 140h-3 into an angular range 135-3 (not shown in FIG. 1A) is guided by the light guide 130 in the forward direction. In this example, the angular range 135-3 of the transmitted light is substantially equal to the angular range 135-2 of the incident light. The light propagating through the light guide further interacts with the remaining redirecting surfaces in a similar manner to the ones described above. Hence, the guided light has an angular range 135-(N−1) when it impinges on the redirecting end-face 140e-N, 140f-N, 140g-N or 140h-N.

Return light generated by reflection off of the redirecting end-face 140e-N, 140f-N, 140g-N or 140h-N in a $N^{th}$ instance of the first return angular range 142a-N impinges on the light guide side surface 132a at point Pa-N and most of it transmits through the light guide side surface 132a as output light in a $N^{th}$ instance of first side angular range 152a-N. In this example, a prevalent direction of propagation direction within and a divergence of the $N^{th}$ instance of the first return angular range 142a-N are equal to the corresponding ones of the $(N−1)^{th}$ instance of the first return angular range 142a-(N−1). Hence, a prevalent propagation direction within and a divergence of the $N^{th}$ instance of the first side angular range 152a-N are equal to the corresponding ones of the $(N−1)^{th}$ instance of the first side angular range 152a-(N−1).

Light transmitted through the redirecting end-face 140e-N, 140f-N, 140g-N or 140h-N outside of the light guide 130 in the forward direction (along the +z axis) represents output light provided by the luminaire module 100 in the third output angular range 145. In some implementations, the third output angular range 145 of the output light is different from the angular range 135-(N−1) of the incident light.

In this manner, light output by the luminaire module 100—equipped with a light guide 130 having anyone of the sets of the redirecting interfaces 140e-i, 140f-i, 140g-i or 140h-i, where i=1 to N—through the light guide side surface 132a in a resultant first output angular range 152a is a combination of light transmitted through the light guide side surface 132a in the first, second, third, ..., $N^{th}$ instances of the first side angular range 152a-1, 152a-2, 152a-3, ..., 152a-N.

In some implementations, a reflectivity $R_i$ of a redirecting interface 140-i (having one or more of the configurations 140e-i, 140f-i, 140g-i or 140h-i) is chosen to be $R_i=1/(N+2-i)$, where i=1 to N, such that return light from each of the N redirecting interfaces emerges through the first light guide side surface 132a in instances of the first output angular range 152a-i with equal intensities. For example, N=4 for a luminaire module with four redirecting interfaces. Here, the first redirecting interface 140-1 has a reflectivity $R_1=1/5=0.2$. If light with intensity $I_0$ is guided to the first redirecting interface 140-1, then the light returned by the first redirecting interface 140-1 has an intensity $I_{R1}=0.2I_0$, while the light transmitted through the first redirecting interface 140-1 has an intensity $I_{T1}=I_0-I_{R1}=0.8I_0$. In this example, substantially all of the light returned from the first redirecting interface 140-1 emerges from the light guide 130 through the first light guide side surface 132a within a first instance of the first output angular range 152a-1 with intensity $I_{a1}=I_{R1}=0.2I_0$. Further, the second redirecting interface 140-2 has a reflectivity $R_2=1/4=0.25$. Here, light transmitted through the first redirecting interface 140-1 with intensity $0.8I_0$ is guided to the second redirecting interface 140-2. As such, the light returned by the second redirecting interface 140-2 has an intensity $I_{R2}=0.25*0.8I_0=0.2I_0$, while the light transmitted through the second redirecting interface 140-2 has an intensity $I_{T2}=0.8I_0-I_{R2}=0.6I_0$. In this example, substantially all of the light returned from the second redirecting interface 140-2 emerges from the light guide 130 through the first light guide side surface 132a within a second instance of the first output angular range 152a-2 with intensity $I_{a2}=I_{R2}=0.2I_0$. Furthermore, the third redirecting interface 140-3 has a reflectivity $R_3=1/3$. Here, light transmitted through the second redirecting interface 140-2 with intensity $0.6I_0$ is guided to the third redirecting interface 140-3. As such, the light returned by the third redirecting interface 140-3 has an intensity $I_{R3}=(1/3)*0.6I_0=0.2I_0$, while the light transmitted through the third redirecting interface 140-3 has an intensity $I_{T3}=0.6I_0-I_{R3}=0.4I_0$. In this example, substantially all of the light returned from the third redirecting interface 140-3 emerges from the light guide 130 through the first light guide side surface 132a within a third instance of the first output angular range 152a-3 with intensity $I_{a3}=I_{R2}=0.2I_0$. Finally, the fourth redirecting interface 140-4 has a reflectivity $R_4=1/2=0.5$. Here, light transmitted through the third redirecting interface 140-3 with intensity $0.4I_0$ is guided to the fourth redirecting interface 140-4. As such, the light returned by the fourth redirecting interface 140-4 has an intensity $I_{R4}=0.5*0.4I_0=0.2I_0$, while the light transmitted through the fourth redirecting interface 140-4 has an intensity $I_{T4}=0.4I_0-I_{R4}=0.2I_0$. In this example, substantially all of the light returned from the fourth redirecting interface 140-4 emerges from the light guide 130 through the first light guide side surface 132a within a fourth instance of the first output angular range 152a-4 with intensity $I_{a4}=I_{R4}=0.2I_0$. Note that in this example, $I_{a1}=I_{a2}=I_{a3}=I_{a4}=0.2I_0$, such that uniform light is extracted through the light guide side surface 132a over a portion of length $\Delta$ of the light guide 130.

In other implementations, a reflectivity $R_i$ of a redirecting interface 140-i (having one or more of the configurations 140e-i, 140f-i, 140g-i or 140h-i) is chosen to be the same, $R_i=R$, for all i=1 to N, such that return light from the N redirecting interfaces emerges through the first light guide side surface 132a in instances of the first output angular range 152a-i with decreasing intensities. For example, N=4 for a luminaire module with four redirecting interfaces. Here, the first redirecting interface 140-1 has a reflectivity R=0.5. If light with intensity $I_0$ is guided to the first redirecting interface 140-1, then the light returned by the first redirecting interface 140-1 has an intensity $I_{R1}=0.5I_0$, while the light transmitted through the first redirecting interface 140-1 has an intensity $I_{T1}=I_0-I_{R1}=0.5I_0$. In this example, substantially all of the light returned from the first redirecting interface 140-1 emerges from the light guide 130 through the first light guide side surface 132a within a first instance of the first output angular range 152a-1 with intensity $I_{a1}=I_{R1}=0.5I_0$. Further, the second redirecting interface 140-2 has a reflectivity R=0.5. Here, light transmitted through the first redirecting interface 140-1 with intensity $0.5I_0$ is guided to the second redirecting interface 140-2. As such, the light returned by the second redirecting interface 140-2 has an intensity $I_{R2}=0.5*0.5I_0=0.25I_0$, while the light transmitted through the second redirecting interface 140-2 has an intensity $I_{T2}=0.5I_0-I_{R2}=0.25I_0$. In this example, substantially all of the light returned from the second redirecting interface 140-2 emerges from the light guide 130 through the first light guide side surface 132a within a second instance of the first output angular range 152a-2 with intensity $I_{a2}=I_{R2}=0.25I_0$. Furthermore, the third redirecting interface 140-3 has a reflectivity R=0.5. Here, light transmitted through the second redirecting interface 140-2 with intensity $0.25I_0$ is guided to the third redirecting interface 140-3. As such, the light returned by the third redirecting interface 140-3 has an intensity $I_{R3}=0.5*0.25I_0=0.125I_0$, while the light transmitted through the third redirecting interface 140-3 has an intensity $I_{T3}=0.25I_0-I_{R3}=0.125I_0$. In this example, substantially all of the light returned from the third redirecting interface 140-3 emerges from the light guide 130 through the first light guide side surface 132a within a third instance of the first output angular range 152a-3 with intensity $I_{a3}=I_{R3}=0.125I_0$. Finally, the fourth redirecting interface 140-4 has a reflectivity R=0.5. Here, light transmitted through the third redirecting interface 140-3 with intensity $0.125I_0$ is guided to the fourth redirecting interface 140-4. As such, the light returned by the fourth redirecting interface 140-4 has an intensity $I_{R4}=0.5*0.125I_0=0.0625I_0$, while the light transmitted through the fourth redirecting interface 140-4 has an intensity $I_{T4}=0.125I_0-I_{R4}=0.0625I_0$. In this example, substantially all of the light returned from the fourth redirecting interface 140-4 emerges from the light guide 130 through the first light guide side surface 132a within a fourth instance of the first output angular range 152a-4 with intensity $I_{a4}=I_{R4}=0.0625I_0$. Note that in this example, $I_{a1}=0.5I_0$, $I_{a2}=0.25I_0$, $I_{a3}=0.125I_0$, $I_{a4}=0.0625I_0$, such that the intensity of the light output through the first light guide side surface 132a decreases over a portion of length Δ of the light guide 130.

In yet other implementations, other reflectivities Ri of the redirecting interfaces 140-i, i=1 to N, (having one or more of the configurations 140e-i, 140f-i, 140g-i or 140h-i) can be chosen.

Figure 3E:
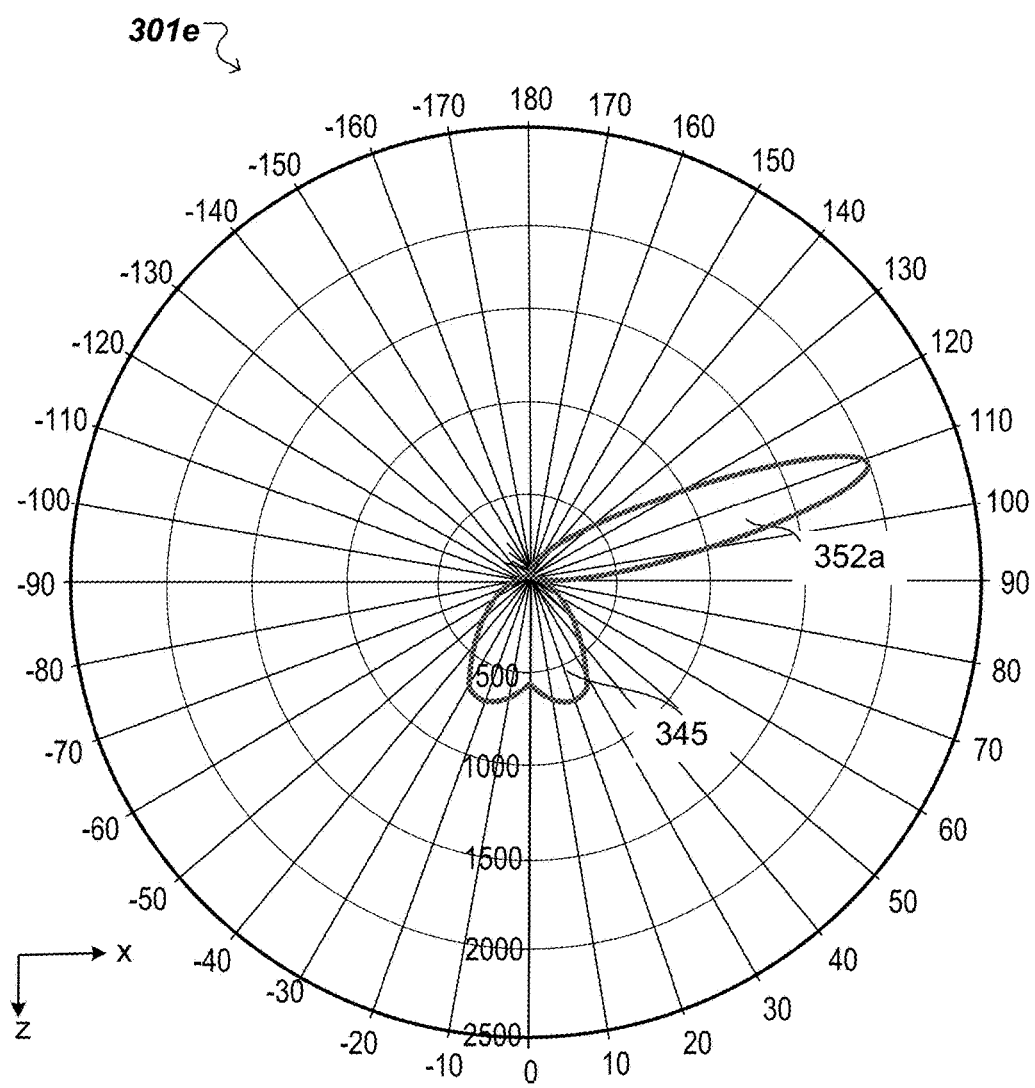
FIGS. 3E-3F illustrate light intensity distributions corresponding to the luminaire module of FIG. 1A having the light guide with the redirecting interfaces illustrated in FIGS. 3A-3D.

FIG. 3E shows an intensity distribution 301e of light output by the luminaire module 100 in the x-z cross-section configured to emit light into the ambient in forward and substantially only via one side of the light guide. Here, the luminaire module 100 is equipped with anyone of the sets of redirecting interfaces 140e-i, 140f-i, 140g-i or 140h-i, where i=1 to N, and the redirecting end-face 140e-N, 140f-N, 140g-N or 140h-N has a coating of semitransparent material or a reflecting coating that has apertures (or semitransparent) portions. Lobe 352a corresponds to output light transmitted through the light guide side surface 132a in the first output angular range 152a. Lobe 345 corresponds to output light transmitted through the redirecting end-face 140e-N, 140f-N, 140g-N or 140h-N in the third output angular range 145.

An orientation of the lobe 352a (e.g., with respect to the z-axis) and a shape of thereof (e.g., aspect ratio of the lobe 352a) depends on respective propagation direction and divergence of the return light in the first return angular range 142a (due to transmissions at points $P_a$, $P_a"$, etc.) As described above, the propagation directions and divergences of the return light in the instances of the first return angular range 142a-i depend on the structure of each of embodiments 140e-i, 140f-i, 140g-i or 140h-i, i=1 to N, of the redirecting interfaces. An orientation of the lobe 345 (e.g., with respect to the z-axis) and a shape of thereof (e.g., batwing) depend on (i) collimating characteristics of the one or more couplers 120, and (ii) guiding characteristics of the light guide 130. Relative sizes of the lobes 352a and 345 depend on a combination of (i) reflectance of coatings of the redirecting interfaces 140-i, and (ii) structure of the embodiments 140e-i, 140f-i, 140g-i or 140h-i, of the redirecting interfaces.

Figure 3F:
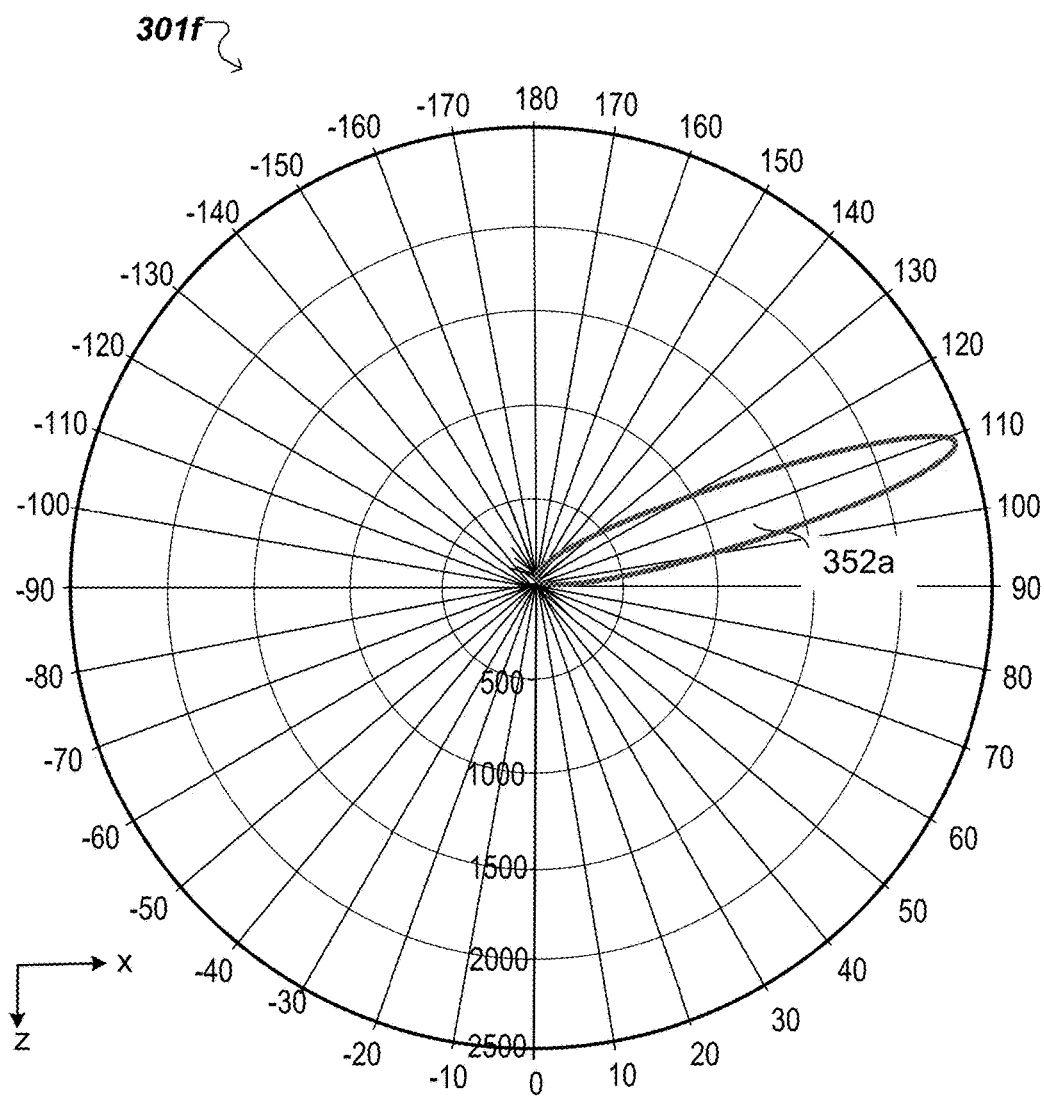

FIG. 3F shows an intensity distribution 301f of light output by the luminaire module 100 in the x-z cross-section configured to emit light into the ambient substantially only via one side of the light guide. Here, the luminaire module 100 is equipped with anyone of the sets of the redirecting interfaces 140e-i, 140f-i, 140g-i or 140h-i, where i=1 to N, and the redirecting end-face 140e-N, 140f-N, 140g-N or 140h-N has a reflecting coating (with reflectance higher than 98%, for instance.) Lobe 352a corresponds to output light transmitted through the light guide side surface 132a in the first output angular range 152a.

An orientation of the lobe 352a (e.g., with respect to the z-axis) and a shape of thereof (e.g., aspect ratio of the lobe 352a) depends on respective propagation direction and divergence of the return light in instances of the first return angular range 142a-i, i=1 to N, (due to transmissions at points $P_a$-1, $P_a$-2, . . . , $P_a$-N.) As described above, the propagation directions and divergences of the return light in the instances of the first return angular range 142a-i depend on the structure of each of embodiments 140e-i, 140f-i, 140g-i or 140h-i, i=1 to N, of the redirecting interfaces.

In general, illumination devices (e.g., luminaire modules 100) described in this specification are configured to use light flux originating from a primary source (LEEs 110) of known dimensional, geometric, brightness and uniformity characteristics, and additional reflector/refractor/combination optics to output a specified radiation pattern. The additional optics redistribute the source flux's "phase-space" to a new phase-space of prescribed dimensional extent and angular divergence (e.g., directional cosines) while maintaining a substantially uniform intensity from the additional optics. These illumination devices can provide uniform illumination of the work surface, efficient energy conversion from the light source of the devices to the work surface, and uniform and/or glare-free intensity from the fixture itself when viewed from the work surface. Additionally, these devices can provide glare-free intensity characteristics while maintaining efficiency and directionality in flux redirection.

Depending on the embodiment, two or more of the one or more optical couplers 120 and light guide 130 of any of the luminaire modules 100 described above can be modularly configured. Modularly configured components of the disclosed luminaires 100 include or are configured for operative interconnection with suitably formed interconnection elements configured to facilitate registration, assembly and/or disassembly during manufacture, field servicing, or resurfacing, for example. Integral formation of two or more optical components of the disclosed luminaires, for example the optical couplers 120 and the light guide 130, can be employed to maintain Fresnel losses that may otherwise occur at optical interfaces at or below predetermined levels. Integral formation can facilitate registration and alignment of respective components of a luminaire.

Components of the disclosed luminaires 100 can be formed from commodity plastics, sheet metals and/or other materials, for example. As such, the foregoing components can undergo molding, extrusion, casting, bending and/or other processes.

For instance, the LEEs 110 can be placed on a carrier (e.g., elongated along the y-axis) made from extruded aluminum, such that the carrier not only supports the LEEs 110 but also has extended cooling surfaces to provide heat dissipation during operation.

In some implementations, the optical couplers 120 and the light guide 130 are fabricated from transparent plastics and have a full cross-section. Such optical components are referred to as solid optics. In some cases, the optical couplers 120 and the light guide 130 are integrally formed. In other implementations, the optical couplers 120 are fabricated from or have coatings of reflective materials such as Al, Ag, Au and have hollow cross-section. The latter optical components are referred to as hollow optics.

In some implementations, the structure of the redirecting interfaces 140-$i$, $i$=1 to N, of the light guide 130 can be machined. The machining/micro-machining can be performed using mechanical/micro-mechanical tools and/or lasers to form a redirecting interface 140-$i$ of the light guide material with a desired structure. In other implementations, the structure of the redirecting interfaces 140-$i$, $i$=1 to N, of the light guide 130 can be cast. The casting can be performed using an embossing process to form a redirecting interface 140-$i$ of the light guide material with the desired structure, followed by a curing process of the embossed light guide material.

In some implementations, reflecting or semi-transparent coatings are applied onto the structure of the formed redirecting interfaces 140-$i$, $i$=1 to N, to achieve a desired reflectivity of the formed redirecting interfaces 140-$i$. For example, a reflecting or semi-transparent coating can be applied by evaporating one or more metal layers onto the previously formed structure of a redirecting interface, such that a reflectivity of the redirecting interface is determined, at least in part, by a thickness of the metal layer(s) and reflective properties of constitutive material(s), e. g., Al, Ag, Au, and their alloys/mixtures with each other and/or other materials. As another example, a reflecting or semi-transparent coating can be applied by forming a stack of dielectric layers onto the previously formed structure of a redirecting interface, such that a reflectivity of the redirecting interface is determined, at least in part, by thicknesses and refractive indices of constitutive materials the dielectric layers, e.g., Si, SiOx, etc. In other implementations, the desired reflectivity of the formed redirecting interfaces 140-$i$, $i$=1 to N, can be achieved by altering the refractive index of the light guide material adjacent each of the formed redirecting interfaces 140-$i$. The refractive index of the light guide material adjacent a formed redirecting interface can be altered through ion-implantation, for instance.

In yet other implementations, the structure of the redirecting interfaces 140-$i$, $i$=1 to N, of the light guide 130 can be obtained by altering a refractive index of the light guide material at locations adjacent respective target locations of the redirecting interfaces. Here, the refractive index of the light guide material is altered in 3D (e.g., within the x-y plane of the light guide 130 and along the z-axis of the light guide 130), in a manner that defines the desired structure of each of the redirecting interfaces 140-$i$. The refractive index of the light guide material can be altered through ion-implantation, for instance.

Unless defined otherwise, all technical and scientific terms used herein have the same meaning as commonly understood by one of ordinary skill in the art to which this technology belongs.

The invention claimed is:

1. A luminaire module comprising:
   one or more light-emitting elements (LEEs) arranged to provide light in a first angular range;
   one or more optical couplers; and
   a light guide comprising
      a receiving end and an opposing end, the receiving end arranged to receive the light provided by the LEEs, wherein the optical couplers are arranged to receive the light provided by the LEEs and redirect it to the receiving end of the light guide in a second angular range,
      a pair of opposing side surfaces extending along a length of the light guide between the receiving end and the opposing end, the light guide configured to guide the received light in a forward direction, along the length of the light guide to the opposing end of the light guide, wherein a numerical aperture of the light guide is such that the light redirected by the optical couplers in the second angular range can be guided by the light guide through TIR off the pair of opposing side surfaces, and
      a plurality of redirecting interfaces spaced apart from each other and distributed along a portion of the length of the light guide adjacent the opposing end, the redirecting interfaces configured to reflect a portion of the guided light in a backward direction as return light, such that substantially all the return light can transmit through the pair of opposing side surfaces into the ambient as output light of the luminaire module, the output light to propagate in backward directions,
   wherein, for each redirecting interface of the plurality of redirecting interfaces,
      the guided light that reaches the redirecting interface is in a third angular range,
      a configuration of the redirecting interface is such that return light generated by the redirecting interface is in a first return angular range, and
      the first return angular range has substantially no overlap with the third angular range, such that the return light within the first return angular range impinges on a first side surface of the pair of opposing side surfaces at incident angles larger than critical incidence.

2. The luminaire module of claim 1, wherein
   the plurality of redirecting interfaces comprises a redirecting end-face located at the opposing end, and
   the redirecting interfaces different from the redirecting end-face are further configured to transmit a remaining portion of the guided light in the forward direction, such that the transmitted light can be guided by the light guide in the forward direction.

3. The luminaire module of claim 2, wherein the redirecting interfaces are coated with reflecting material.

4. The luminaire module of claim 2, wherein the portion of the length of the light guide over which the redirecting interfaces are distributed is a fraction of a distance between the receiving end and opposing end.

5. The luminaire module of claim 4, wherein the fraction is 90% or less.

6. The luminaire module of claim 4, wherein the fraction is 50% or less.

7. The luminaire module of claim 4, wherein the fraction is 10% or less.

8. The luminaire module of claim 2, wherein the redirecting end-face has a reflectivity larger than 98%.

9. The luminaire module of claim 1, wherein the light guide is configured to guide the received light in a forward direction through total internal reflection (TIR) off the opposing side surfaces.

10. The luminaire module of claim 1, wherein the return light in the first return angular range transmits through the first side surface as output light in a first output angular range with a propagation direction having a component anti-parallel to the forward direction.

11. The luminaire module of claim 1, wherein each of the redirecting interfaces comprises one or more sawtooth-shaped sections.

12. The luminaire module of claim 11, wherein the sawtooth-shaped sections are symmetrical.

13. The luminaire module of claim 1, wherein
the configuration of the redirecting interface is such that return light generated by the redirecting interface is also in a second return angular range, and
the second return angular range has substantially no overlap with the third angular range, such that the return light within the second return angular range impinges on the second side surface of the pair of opposing side surfaces at incident angles larger than critical incidence.

14. The luminaire module of claim 13, wherein the return light in the second return angular range transmits through the second side surface as output light in a second output angular range with a propagation direction having a component anti-parallel to the forward direction.

15. The luminaire module of claim 1, wherein reflectivities of the redirecting interfaces are selected, such that return light from each of the redirecting interfaces has substantially the same intensity.

16. The luminaire module of claim 1, wherein the redirecting interfaces have substantially the same reflectivity.

* * * * *